J. S. THOMPSON.
TYPOGRAPHICAL COMPOSING, CASTING, AND DISTRIBUTING MACHINE.
APPLICATION FILED APR. 29, 1920.

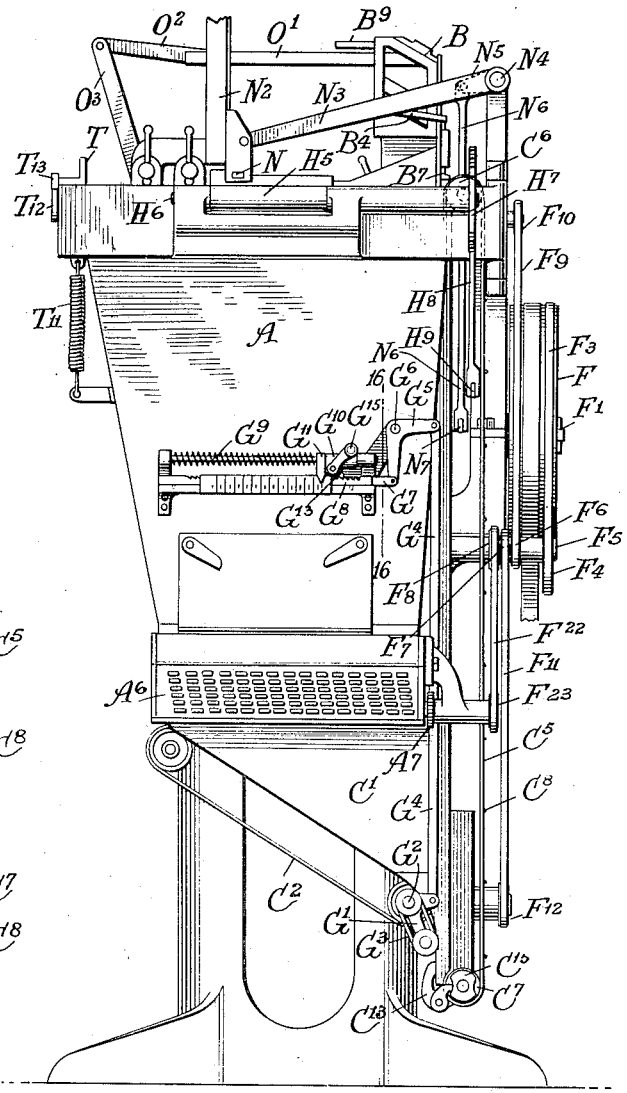
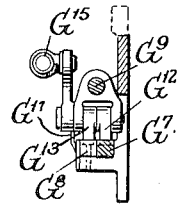
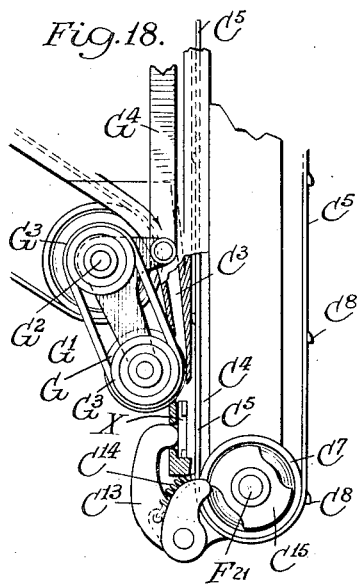

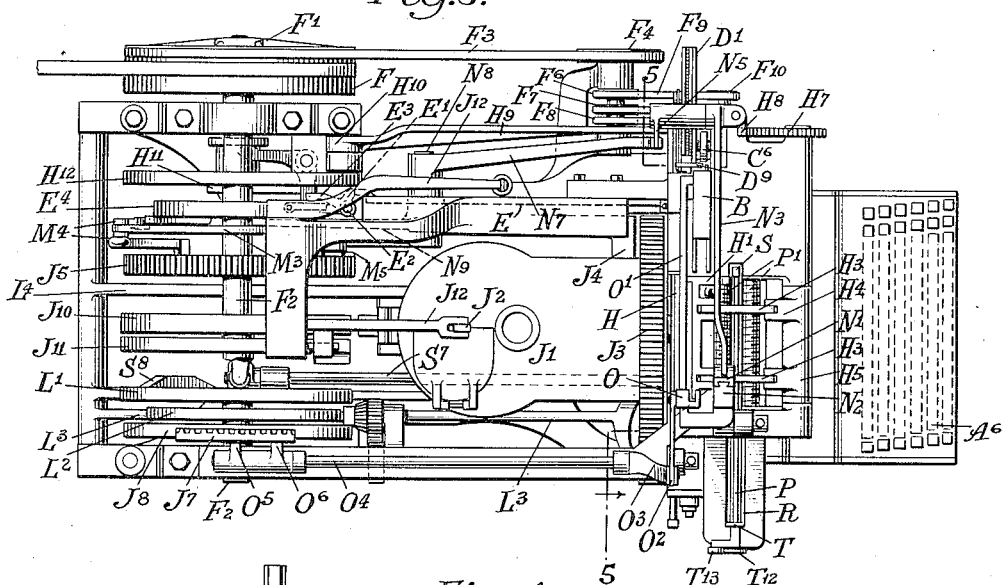
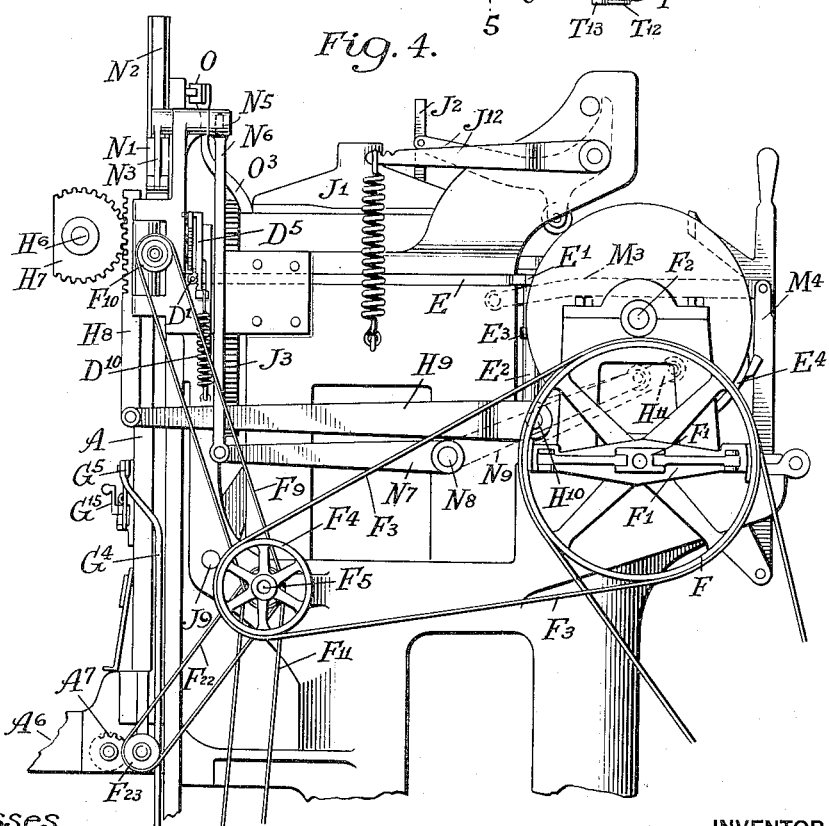

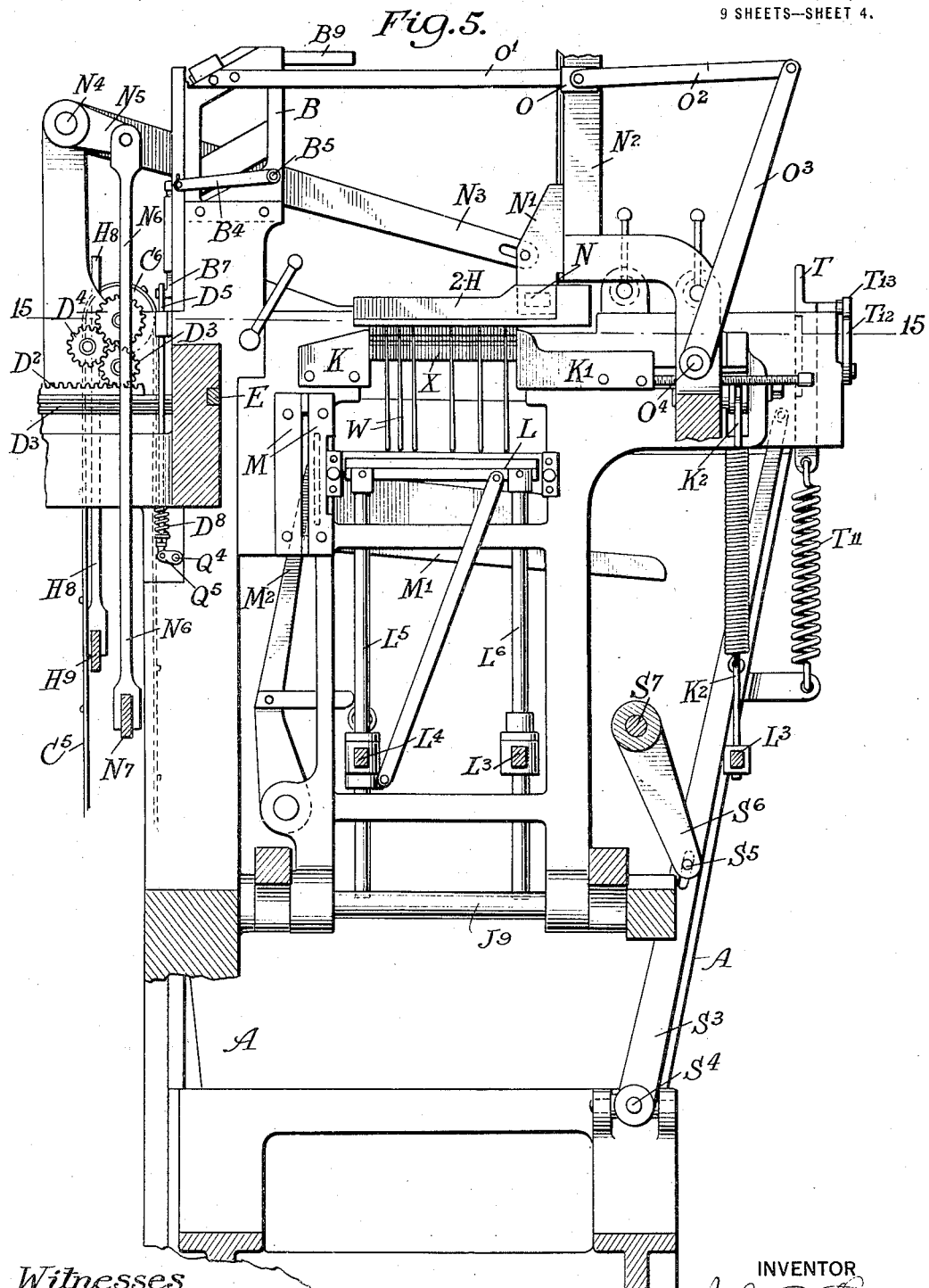

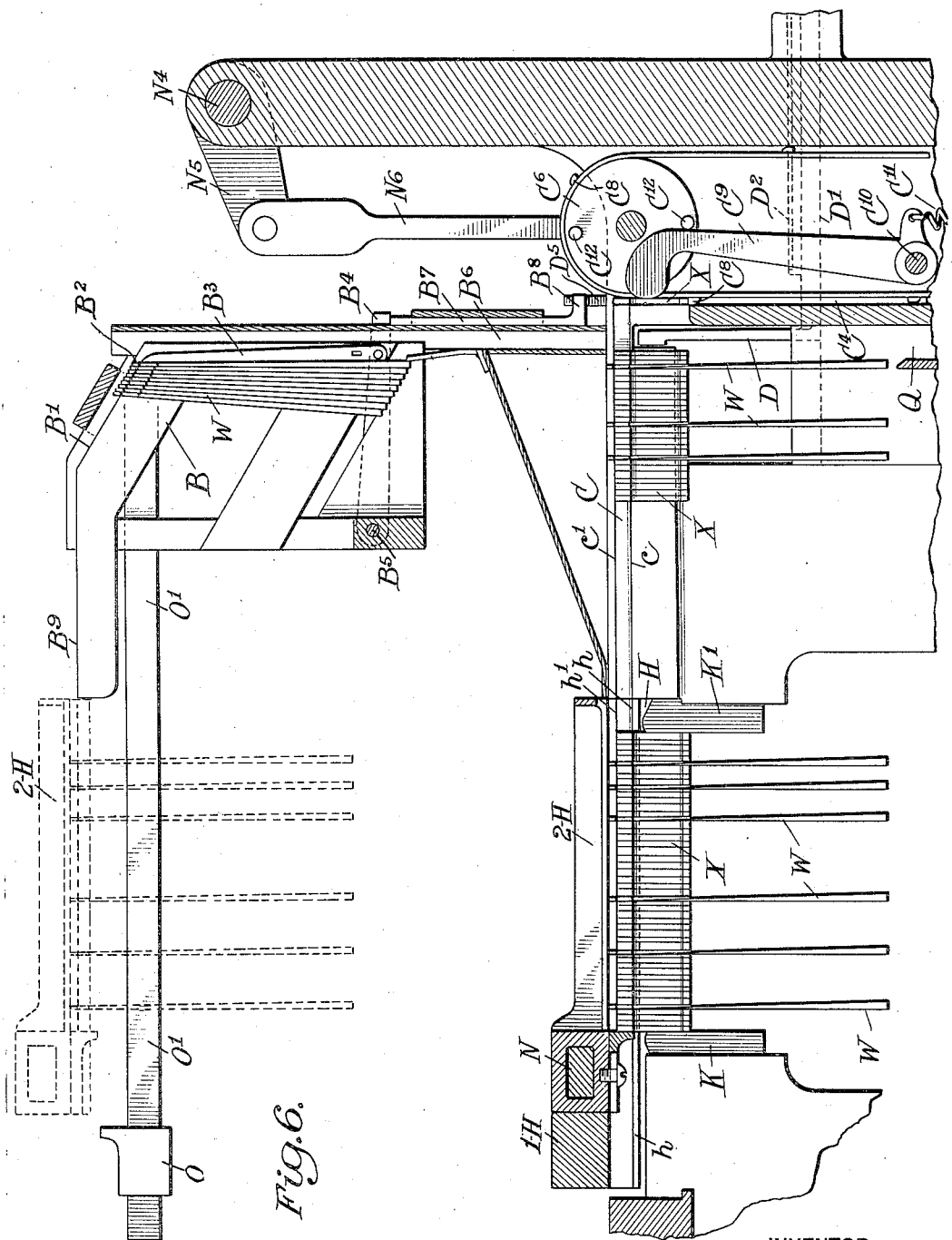

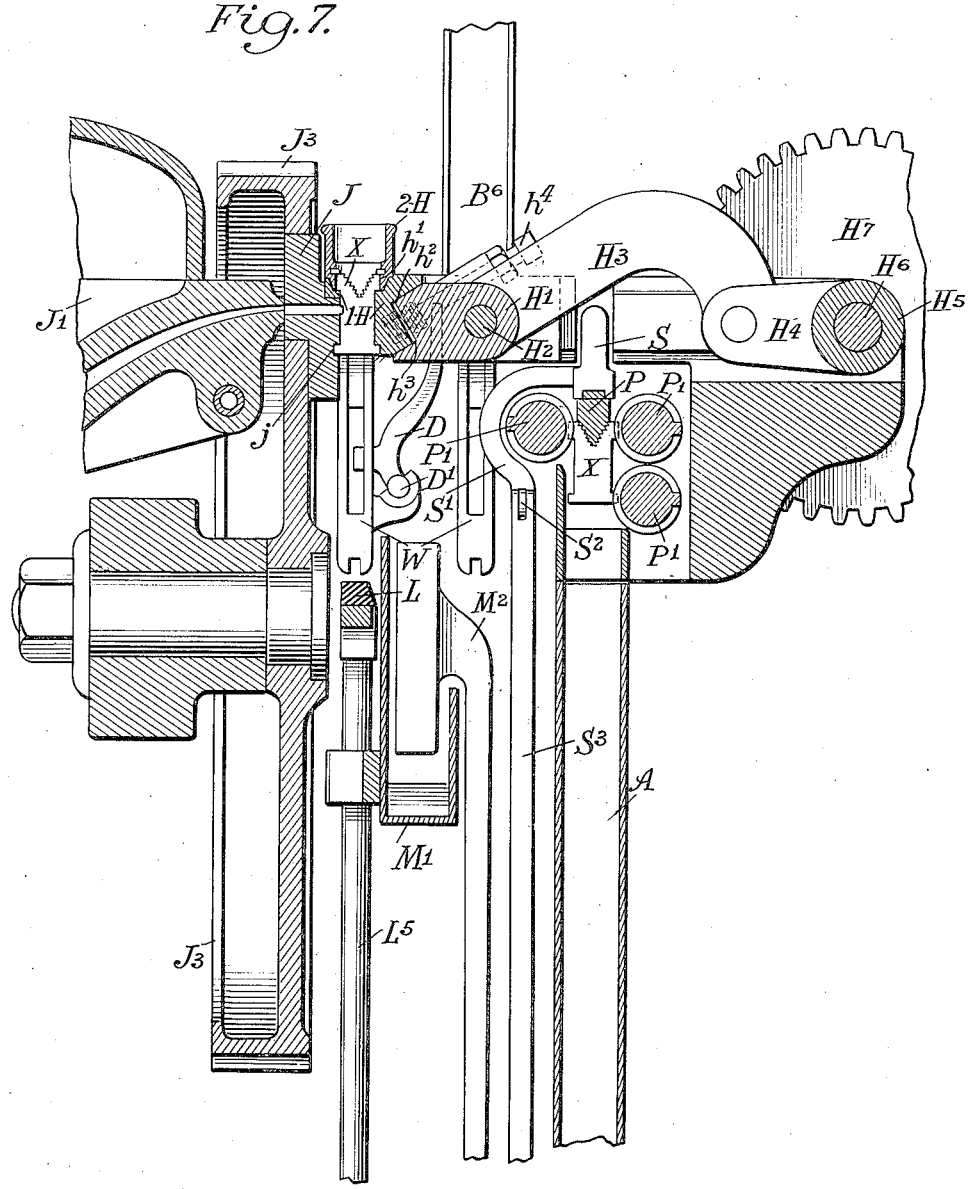

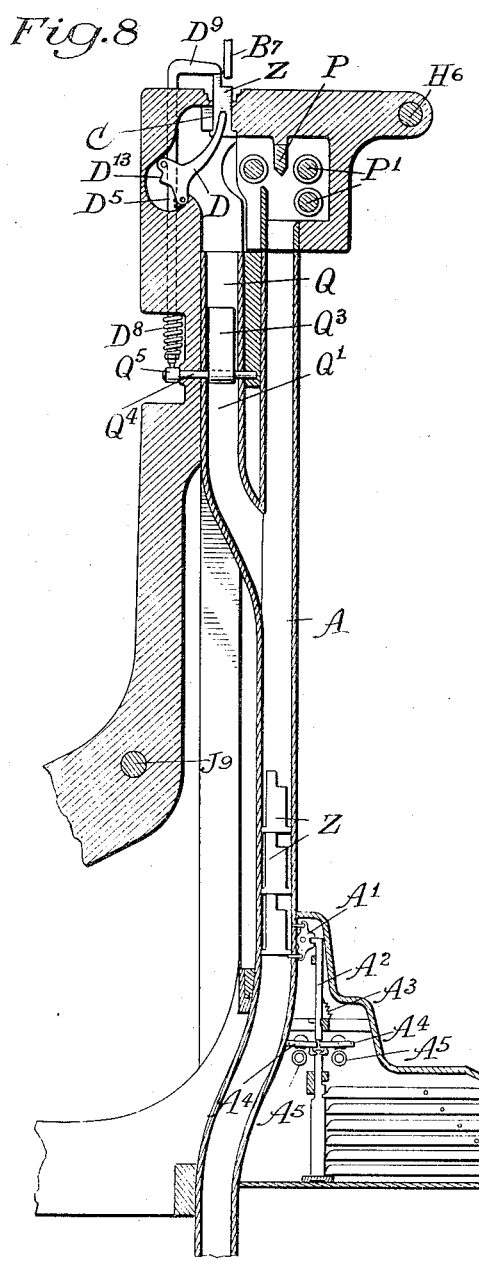
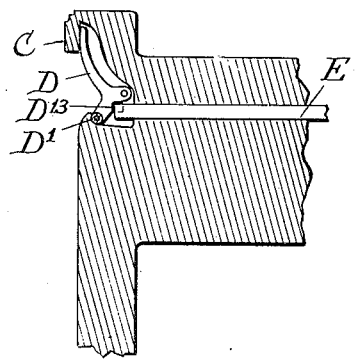
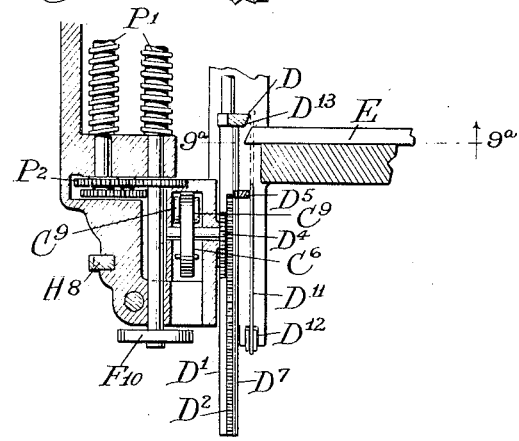

1,427,501.

Patented Aug. 29, 1922.
9 SHEETS—SHEET 8

Witnesses
M. R. Manning
L. E. Thompson

INVENTOR
John S. Thompson
BY
Rogers, Kennedy & Campbell
ATTORNEYS

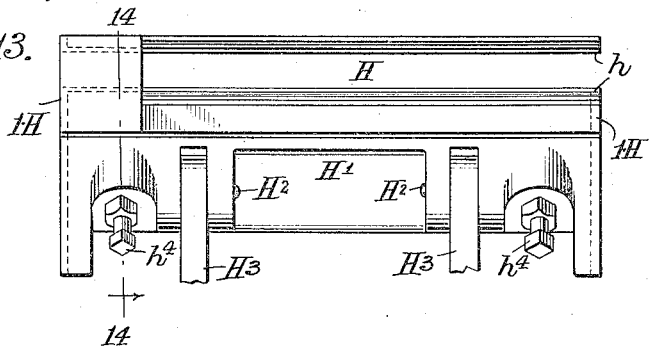
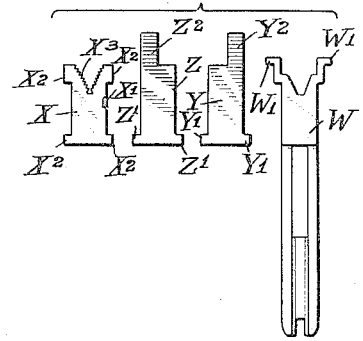
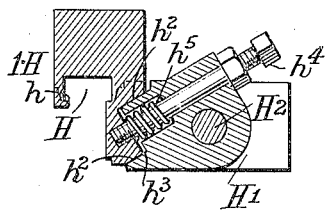
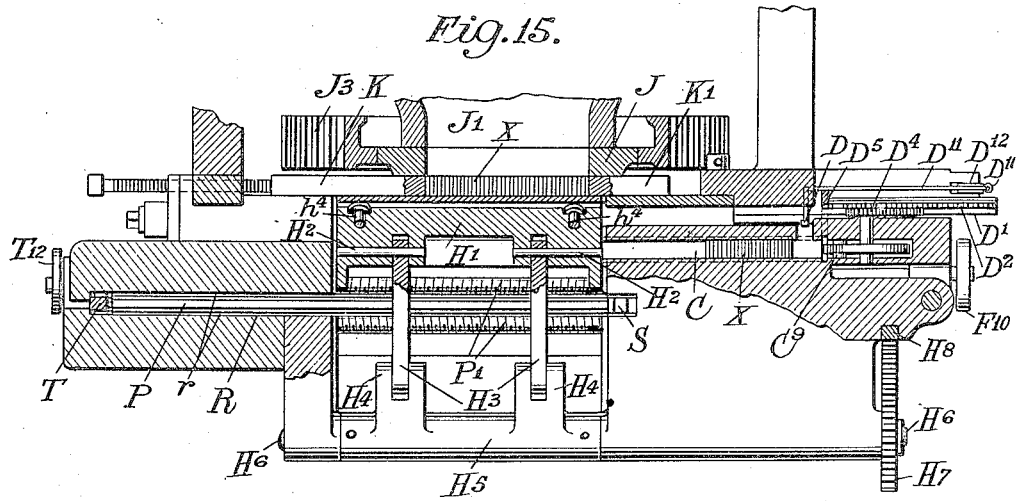

UNITED STATES PATENT OFFICE.

JOHN S. THOMPSON, OF SAN FRANCISCO, CALIFORNIA, ASSIGNOR TO MERGENTHALER LINOTYPE COMPANY, A CORPORATION OF NEW YORK.

TYPOGRAPHICAL COMPOSING, CASTING, AND DISTRIBUTING MACHINE.

1,427,501.  Specification of Letters Patent.  Patented Aug. 29, 1922.

Application filed April 29, 1920. Serial No. 377,476.

*To all whom it may concern:*

Be it known that I, JOHN S. THOMPSON, a citizen of the United States, residing at San Francisco, in the county of San Francisco and State of California, have invented certain new and useful Improvements in Typographical Composing, Casting, and Distributing Machines, of which the following is a specification, reference being had therein to the accompanying drawing.

This invention relates to typographical machines, such as linotype machines of the general organization represented in U. S. Letters Patent No. 436,532, to O. Mergenthaler. In these machines, the type casting matrices are stored in an inclined channeled magazine and are released therefrom in the proper order under the action of escapements controlled by a keyboard. When so released, the matrices pass by gravity through a vertical channeled raceway or front plate and fall onto an inclined endless conveyor belt which carries them downwardly to the left and delivers them into an assembling elevator or channel wherein they are composed in line with justifying spacers released from an overlying magazine. After composition of the line, the assembling elevator is raised to trip a transfer carriage, which thereupon shifts the composed line to the left out of the elevator and carries it through an intermediate channel into a first elevator or casting channel, the movement of the transfer carriage at the same time starting the operation of the machine. Upon the receipt thereof, the first elevator descends and presents the composed line in operative relation to a mold for the casting of the slug or linotype. After casting, the first elevator is lifted into registration with an upper transfer channel (arranged above the intermediate channel) and then a further transfer device sweeps the composed line to the right from the elevator into the transfer channel, the matrices being pushed onto the lifting bar of a so-called second elevator, and the spacers being sustained within the transfer channel. Following this second transfer of the line, the first elevator descends and comes to rest in its original receiving position ready for the next line, while the second elevator bar is carried upward from the transfer channel and brought to rest in registration with a distributing box or channel, the spacers which have been left behind in the upper transfer channel in the meantime being swept from such channel into the magazine from which they were released. Another transfer device now shifts the matrices to the right from the second elevator into the distributor box, whence they are fed to and traversed along a distributor-bar arranged above the magazine and which releases the matrices at different points in its length according to character and drops them into the proper magazine-channels.

In their circulation through the machine, therefore, the matrices pursue a long and circuitous path, due to the fact that the assembling, casting and distributing mechanisms are arranged at widely separated points and at different levels, the assembly position being below the magazine, the casting position at even a lower level, and the distributing position above the magazine.

It is the general object of the present invention to simplify the construction and operation of the foregoing machine in such manner that the matrices may be assembled in line and presented in turn to the casting and distributing mechanisms with the minimum number of movements and by the shortest possible path. To this end, the present machine is organized to carry out the assembling, casting and distributing operations above the magazine at a common level and at closely arranged points, which organization not only presents a more compact arrangement of the parts but materially reduces the time consumed in the circulation of the matrices through the machine. Various other advantages will appear from the detailed description to follow.

In the accompanying drawings, I have shown my invention only in preferred form and by way of example and as applied to a machine of the class stated, but obviously many variations and changes may be made therein, and in its mode of application, which will still be comprised within its spirit. Generally speaking, I desire it to be understood that I do not limit myself to any specific form or embodiment except in so far as such limitations are specified in the claims.

Referring to the drawings:

Figure 1 is a front elevation of my improved machine;

Figure 3 is a top plan view;

Figure 4 is a side elevation of the upper part of the machine looking from the right in Fig. 1;

Figure 5 is a vertical section taken on the line 5—5 of Fig. 3 looking from the rear or in the direction of the arrows;

Figure 6 is an enlarged vertical section taken through the assembling and casting channels and the spacer magazine, etc.;

Figure 7 is an enlarged vertical section taken through the machine at casting position;

Figure 8 is a vertical section taken through the magazine, distributor and keyboard in a plane passing through the assembling channel near its entrance end;

Figure 9 is a horizontal section taken through a portion of the machine at the right just above the distributor, and showing in particular the driving mechanism for the distributor and the line transfer device;

Figure 2:
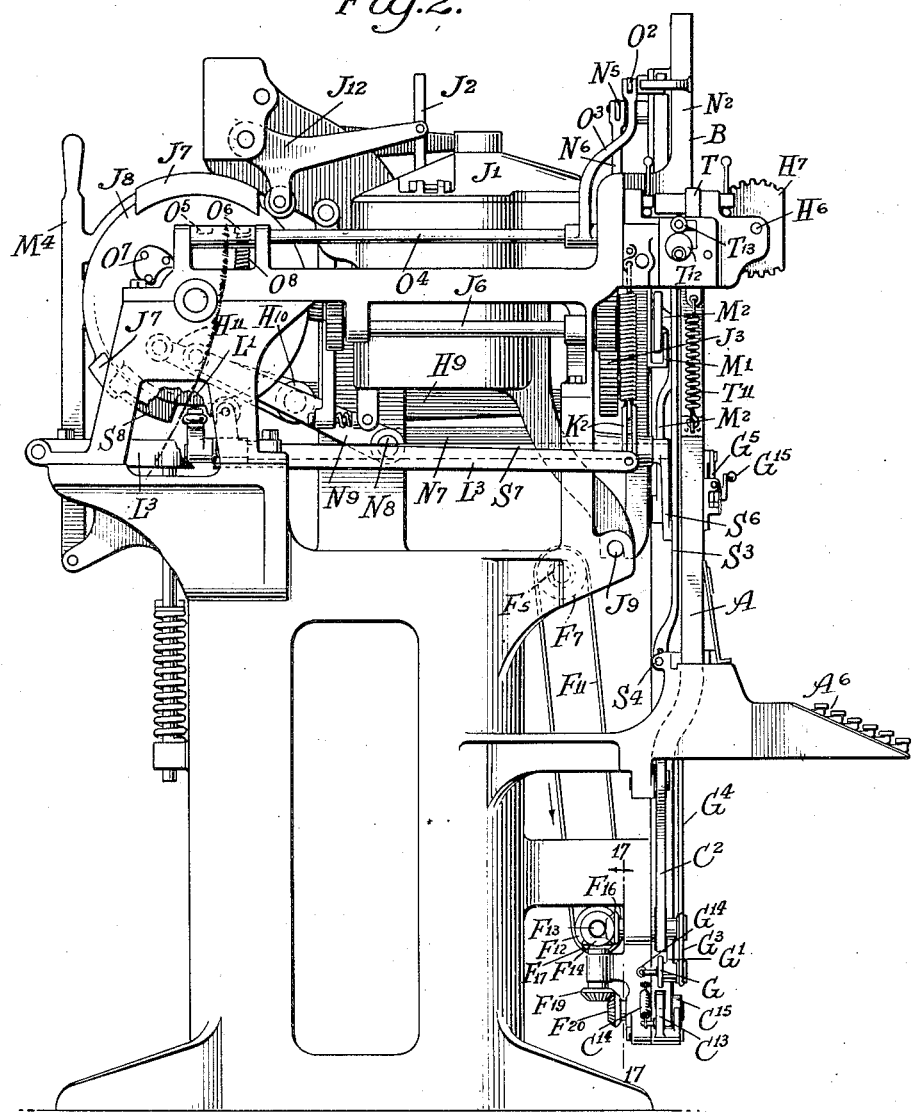
Figure 2 is a side elevation of the same looking from the left in Fig. 1.
Figure 17:
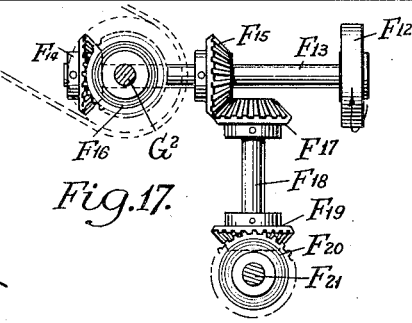
Figure 10:
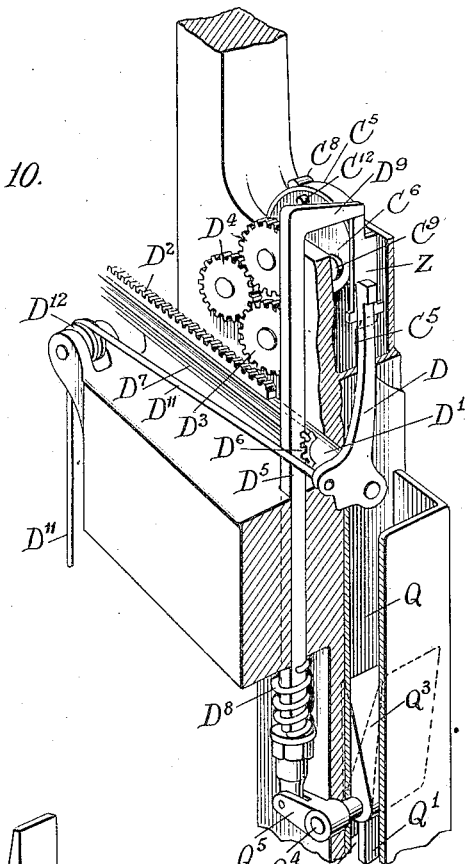
Figure 12:
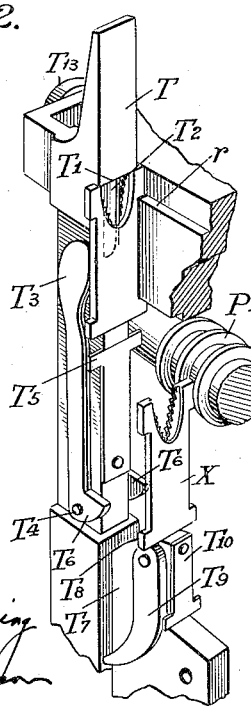
Figure 11:
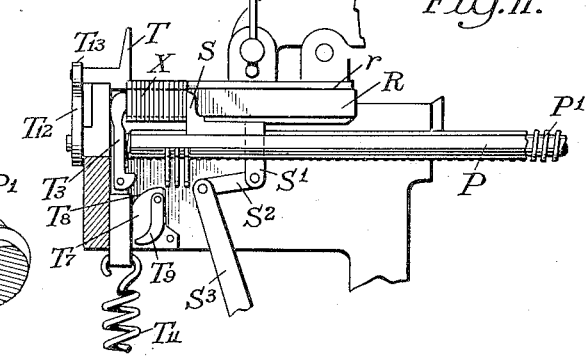

Figure 9$^a$ is a vertical section taken on the line 9$^a$—9$^a$ of Fig. 9 looking toward the right or in the direction of the arrows;

Figure 10 is a rear perspective view showing in detail the construction and operation of the line-transfer device;

Figure 11 is a vertical section looking from the front, taken through the distributing channel, the matrix distributor and the intermediate feed devices;

Figure 12 is an enlarged front perspective view of the parts shown in Fig. 11;

Figure 13 is a top plan view of the casting channel detached;

Figure 14 is a vertical section taken on the line 14—14 of Fig. 13 looking in the direction of the arrows;

Figure 15 is a horizontal section taken on the line 15—15 of Fig. 5 looking downwardly or in the direction of the arrows;

Figure 16 is a section taken on the line 16—16 of Fig. 1;

Figure 17 is a section taken on the line 17—17 of Fig. 2, showing a portion of the driving connections for the two assembling belts;

Figure 18 is an enlarged detail-view taken at the lower portion of the two assembling belts; and Figure 19 illustrates the form of the matrices and spacers employed in the machine.

*General organization.*—The type-forming matrices X are released from the magazine A by the manipulation of the keyboard A$^6$, whence they are carried upwardly by suitable mechanism and composed in line in the fixed assembling channel C located above the magazine (see Figs. 1, 6 and 15). Justifying spacers W are introduced into the line as needed from the magazine B overlying the assembling-channel C. After composition, the line is shifted to the left into the casting-channel H by the transfer device D (Figs. 6 and 10) which during its return movement starts the operation of the machine. Upon receipt of the composed line, the casting-channel H is slid rearwardly to present the line in operative relation to the mold J (Figs. 7 and 15), and after the slug casting operation is completed, the channel is restored to its receiving position and allowed to pause momentarily for the withdrawal of the spacers from the composed line. This spacer withdrawal is effected by the upper channel-section 2$^H$, which is moved upwardly at such time to lift the spacers from the line and locate them opposite their magazine B into which they are carried by the transfer slide O (see dotted lines in Fig. 6). After the spacers have thus been withdrawn, the casting-channel H is slid forwardly into registration with the fixed distributing-channel R (Fig. 15), whereupon the transfer slide S (Fig. 11) advancing toward the left pushes the matrices before it from the casting-channel into the distributing channel and up against the vertical reciprocating slide T, which feeds them one by one to the distributor proper P, P$^1$, whereby they are separated according to character and dropped into the proper channels of the magazine A from which they started (Fig. 8). Immediately that the matrices are removed from the casting-channel H, it is slid rearwardly back into registration with the assembling-channel C and there comes to rest ready for the next composed line. It will be noted (Fig. 15) that the assembling, casting and distributing channels are all arranged at a common level above the matrix-magazine and in close proximity to each other, the casting channel being slidable horizontally so as first to receive the composed line directly from the fixed assembling channel and subsequently, after the removal of the spacers, deliver the remaining matrices of the composed line directly to the fixed distributing-channel. It should also be noted that in the foregoing arrangement and unlike prior constructions, the composed line is transferred through the machine in one direction only, with the result that the matrices are presented to the distributor in the same order in which they are composed, the first matrix assembled in line being the first to be presented for distribution, which feature is very advantageous in that the return of the matrices to the magazine for further use is considerably expedited.

*The matrices and spacers.*—The matrices and justifying spacers herein employed are shown in Fig. 19. The matrix X, representative of the type forming matrices, is of usual construction, being provided with the intaglio character or matrix proper $X^1$, the four projecting ears $X^2$, and the tooth-combination $X^3$. The matrices Y and Z (which will be termed "non-type-forming matrices") are merely dummies or blanks intended to circulate through the machine and employed to initiate the operation of certain parts in their circulation. These matrices Y and Z, like the matrices X, are formed at their lower ends and on opposite edges with projecting ears $Y^1$ and $Z^1$ respectively, but, unlike the matrices X, they are without projecting ears at their upper ends. In addition, the matrices Y and Z have no tooth-combinations, but instead are formed with upstanding projections $Y^2$ and $Z^2$ respectively, the projection $Y^2$ being located at the rear edge of the matrix Y, and the projection $Z^2$ at the opposite or forward edge of the matrix Z. It is by reason of this difference in form that the matrices are adapted to control the operation of different parts in their travel through the machine, as will be later pointed out. The justifying spacer or spaceband W is of usual construction, its stationary section being provided with the customary supporting ears $W^1$.

*The matrix and spacer magazines and their delivery mechanisms.*—The magazine A is employed to contain the matrices of all three forms above described and may be of any well-known or approved construction. For instance, the channels for the type-forming matrices X may be constituted by sets of opposing grooves formed on the inner faces of the two side plates of the magazine as usual; and, for the non-type-forming matrices Y and Z which have no projecting ears at their upper ends, the two magazine-channels occupied by them may be constituted by intermediate partitions. If desired, the magazine may be devoted exclusively to the matrices X, and a separate holder or holders employed for the dummy matrices Y and Z, which such arrangement would enable the magazine to be freely removed and replaced by another containing type-forming matrices of a different size or style without interfering with the non-type-forming matrices which could remain permanently in the machine. As herein shown, the magazine is arranged vertically, but it may be disposed in any other suitable position. At its lower end (Fig. 8) the magazine is provided with the series of escapements $A^1$ which act to control the release of the matrices one at a time from the magazine-channels in the usual way. These escapements are operated by the reeds $A^2$ which are moved in one direction by the springs $A^3$ and in the opposite direction by the cam-yokes $A^4$, the latter being thrown into engagement with the underlying power-driven rolls $A^5$ by the manipulation of the finger keys $A^6$, all as well understood in the art.

The magazine B wherein the spacebands or spacers W are stored, is of usual construction (Fig. 6), being provided with the pair of inclined rails $B^1$ from which the spacers are suspended by their projecting ears $W^1$ and which are formed at their lower ends with the upstanding shoulders $B^2$ to prevent the escape of the spacers. The release of the spacers from the magazine is controlled by the escapement pawls $B^3$ carried by the two arms $B^4$ fast to the rock-shaft $B^5$, the spacers as they are released descending through the chute $B^6$ into the assembling channel C below. In accordance with the present invention, the escapement pawls $B^3$ are actuated by a vertically movable rod $B^7$ engaged at its upper end with one of the arms $B^4$ and formed at its lower end with a laterally projecting lip $B^8$, which latter is arranged to be engaged by the upstanding projection $Y^2$ of one of the non-type-forming matrices Y in its circulation through the machine, as will subsequently be described.

*The assembling mechanism and associated devices.*—As the type-forming matrices X are released from the magazine A (Fig. 1), they pass through a channeled raceway or front plate $C^1$ and drop onto an inclined endless conveyor belt $C^2$ which carries them to the right and discharges them into a common receiving throat $C^3$. This throat $C^3$ opens into a vertically arranged chute or trough $C^4$ leading to the assembling channel C and containing one of the stretches of an endless conveyor belt $C^5$ traveling around upper and lower pulleys $C^6$ and $C^7$, respectively. The belt $C^5$ (Figs. 6 and 10) is formed with a series of uniformly spaced cleats or projections $C^8$ adapted in the travel of the belt to engage the lower ends of the matrices as they issue from the throat $C^3$, and carry them upwardly along the chute $C^4$. As each matrix is thus carried upward, it is guided at its opposite edges by the front and rear walls of the chute $C^4$ and at its opposite faces by the left and right walls thereof, the latter wall being constituted by the contiguous stretch portion of the traveling belt $C^5$. This condition maintains until the matrix arrives at the entrance to the assembling channel C, at which point the chute $C^4$ is discontinued (Fig. 6) to allow the matrix to be discharged laterally therefrom into the assembling channel. Such discharge of the matrix is effected by means of a double-armed pusher $C^9$ straddling the belt $C^5$ (Fig. 9) and pivoted at $C^{10}$ to the machine-frame. The pusher $C^9$ is operated in one direction by a spring $C^{11}$ and in the opposite direction by two sets of pins $C^{12}$ projecting at diametrically opposite points from both sides of the upper pulley $C^6$, the arrangement being such that as each cleat $C^8$ on the traveling belt $C^5$ presents the engaged matrix at the entrance to the assembling channel, one set of the pins $C^{12}$ strikes the pusher and rocks it toward the left to discharge such matrix into the channel, the spring $C^{11}$ acting after the pins pass the pusher to restore it to its original position beyond the matrix path. In other words, the matrix pusher is operated periodically in synchronism with the traveling belt so as to advance each matrix into the assembling channel as it is brought to that level by a belt-cleat. As the matrices are discharged into the assembling channel, they are supported therein by their upper ears $X^1$ upon the usual rails $c$.

In order to assist the belt $C^5$ in picking up the matrices as they issue from the receiving throat $C^3$, the latter (Figs. 1 and 2) is provided with a rocking pawl $C^{13}$ moved through the throat by a spring $C^{14}$ and out of the throat by a notched disk or cam $C^{15}$ carried by the lower pulley $C^7$, these rocking movements of the pawl taking place periodically or at each half rotation of the pulley as will be obvious from the drawings. The pawl $C^{13}$ (like the matrix pusher $C^9$) is thus operated in synchronism with the conveyor belt $C^5$ in such manner as to locate each matrix as it issues from the throat in position to be engaged and picked up by a passing cleat $C^8$ on the belt.

It may be mentioned in passing that the feature of composing the matrices in an elevated assembling channel is not only advantageous in carrying out the general objects of the present invention, but is also useful in preventing damage to the matrices in the course of composition. Thus, as each matrix enters the common receiving throat $C^3$, it is immediately removed therefrom and carried upwardly by the belt $C^5$ out of the way of a following matrix, so that no clogging or pounding of the matrices may take place.

The dummy or non-type-forming matrices Y and Z are handled in precisely the same way as the type-forming matrices X, the matrices Y being released from the magazine A by the regular spacer key, and the matrices Z by a special key provided for that purpose. Consequently, these dummy matrices (like the matrices X) are delivered to the traveling belt $C^5$, carried upwardly thereby along the vertical chute $C^4$, and then discharged laterally into the assembling channel C by the pusher $C^9$. Since, however, the dummy matrices have no supporting ears at their upper ends, they clear the sustaining rails $c$ of the assembling-channel and pass through the same, falling into an underlying chute Q (Fig. 6), by which they are returned to their proper channels in the magazine as will later be described.

The manner in which the spacers W are assembled in line will now be clear: Whenever a spacer is to appear in the line, one of the dummy matrices Y is released from the magazine A by the manipulation of the regular spacer key. As the matrix Y is carried upwardly by the belt $C^5$, its upstanding projection $Y^2$ is brought into engagement with the laterally projecting lip $B^8$ of the rod $B^7$ before referred to, which rod is thus raised to actuate the escapement pawls $B^3$ and effect the release of a spacer from the magazine B, it being understood that the projection $Y^2$ is extended sufficiently to engage the projecting lip $B^8$ before the matrix arrives at the entrance to the assembling channel and before the pusher $C^9$ is operated. As before stated, when released, the spacers drop through the chute $B^6$ directly into the assembling channel wherein they are supported by their projecting ears $W^1$ upon the customary rails $c^1$.

When the composition of the line is completed, one of the matrices Z is released from the magazine A and circulated through the machine in the same way as the matrices Y to trip the transfer device or finger D, which thereupon shifts the composed line from the assembling channel C into the casting channel H. This transfer finger, (see particularly Fig. 10) is attached to one end of a slidable rock-shaft $D^1$ provided at its upper side with a rack-bar $D^2$ adapted to cooperate with a driving pinion $D^3$ constantly rotated through intermediate gearing $D^4$ from the upper pulley $C^6$ for the belt $C^5$ (see also Figs. 3, 5, 9 and 15). When the parts are at rest, the transfer finger D stands out of the assembling-channel and the rack-bar $D^2$ is disengaged from the driving pinion $D^3$ (Fig. 15), but by turning the rock-shaft $D^1$, the transfer finger is moved forwardly into the assembling-channel (Fig. 8) and the bar actively engaged with the pinion which thereby shifts the rock-shaft to the left to carry out the transfer of the line. The turning of the rock-shaft $D^1$ is effected by a vertically movable rod $D^5$ provided on its forward edge with rack-teeth $D^6$ meshing with a series of ribs $D^7$ formed on the rock-shaft and extending throughout its length or for a distance equal to the extent of movement of the transfer finger, these ribs $D^7$ thus constituting in effect extended gear-teeth which remain in constant mesh with the rack-teeth $D^6$ in all positions of the rock-shaft. At its lower end, the rod $D^5$ has connected thereto a spring $D^8$ which acts constantly to depress it so as to disengage the rack-bar $D^2$ from the driving pinion $D^3$; and at its upper end, the rod is formed with a forwardly projecting finger $D^9$ which is arranged to be engaged by the upward extension $Z^2$ of a matrix Z as the latter is carried upwardly by the conveyor belt $C^5$ (Fig. 10). As a result of this construction, when the finger $D^9$ is engaged by the rising matrix Z, the rod $D^5$ is lifted against the action of the spring $D^8$, and due to the engagement of the rack-teeth $D^6$ with the gear teeth $D^7$ on the rock shaft $D^1$, the latter is turned to move the transfer finger into the assembling channel and to engage the rack-bar $D^2$ with the constantly rotated driving pinion $D^3$ for the transfer of the composed line, which condition of the parts is shown in Fig. 8. During the transfer of the line, the rack-bar $D^2$ is maintained in mesh with the driving pinion $D^3$ against the action of the spring $D^8$ by the engagement of the transfer finger with the rear wall of the assembling channel. When, however, the transfer finger reaches the limit of its line shifting movement, it is withdrawn from the assembling-channel through a suitable opening cut through the rear wall thereof for that purpose, such withdrawal being effected of course by the reverse turning of the rock-shaft $D^1$ under the action of the spring $D^8$ which is then free to act. The reverse turning of the rock-shaft also disengages its rack-bar $D^2$ from the driving pinion $D^3$, so that other means must be provided to return the parts to their original position. As herein shown such means simply comprise a spring or weight $D^{10}$ attached to the transfer finger by a cord $D^{11}$ passing over a guiding pulley $D^{12}$ (Figs. 4, 10 and 15).

In its return movement, the transfer device actuates means for starting the operation of the machine. As best shown in Figs. 9 and $9^a$, the finger D is formed at its rear edge just above the rock shaft $D^1$ with a beveled lug $D^{13}$ which is adapted in the retracted position of the finger and during its return movement to engage the beveled end of a fore and aft bar E. At its rear end (Figs. 3 and 4), the bar E is engaged with a pawl $E^1$ secured to the upper end of a vertical rod $E^2$, which latter is provided with a further pawl $E^3$ disposed adjacent the well known trip dog carried by the cam wheel $E^4$ on the main-shaft $F^2$ and controlling the engagement and disengagement of the clutch $F^1$ and the continuously rotating pulley F. Consequently, when the bar E is pushed rearwardly by its engagement with the beveled lug $D^{13}$, the rod $E^2$ is turned and causes its pawl $E^3$ to actuate the trip dog and set the machine into operation, the dog acting in the usual manner to stop the operation of the machine upon one complete rotation of the main shaft $F^2$.

In order to guide the operator at all times in the composition of a line, the machine is equipped with a calipering device to measure the thickness of each matrix as it is composed in line and with an indicator to record and display the aggregate thickness of the composed matrices. Referring particularly to Figs. 1 and 2, the receiving throat $C^3$ is formed in one side with a slot or opening to receive a roller G journalled in the lower arm of a bell crank lever $G^1$ loosely mounted on the pulley shaft $G^2$, which latter is connected by a belt and pulley arrangement $G^3$ to the roller journal. The upper arm of the lever $G^1$ is connected by a long upright link $G^4$ to the horizontal arm of a larger bell crank lever $G^5$ pivoted at $G^6$ to the magazine A or to some other suitable part of the machine. The vertical arm of the lever $G^5$ is in turn connected to a horizontal longitudinally movable rack-bar $G^7$ arranged behind a stationary graduated bar or scale $G^8$ which latter is also formed at its upper edge with rack teeth of the same pitch as those on the bar $G^7$. Arranged above the two bars is a rod $G^9$ (Fig. 16) upon which is mounted a slide $G^{10}$ carrying a pointer $G^{11}$ to cooperate with the graduated bar $G^8$ and provided with two pendant pawls $G^{12}$ and $G^{13}$ to engage the rack-teeth of the two underlying bars $G^7$ and $G^8$ respectively. A spring $G^{14}$ (Fig. 2) pulling inwardly on the lower arm of the bell crank lever $G^1$ maintains the parts in normal position with the roller G across the passage of the throat $C^3$. Consequently, as each matrix passes through the receiving throat $C^3$, it engages the roller G and moves it outwardly a distance equal to the thickness of such matrix, this movement of the roller through the connections described being imparted to the rack-bar $G^7$, which by its engagement with the pawl $G^{12}$ advances the pointer slide $G^{10}$ to the left a corresponding distance as indicated by the graduations on the fixed bar or scale $G^8$. The bar $G^7$ is then immediately restored to the right under the action of the spring $G^{14}$, while the pointer slide is held against retrograde movement by the engagement of the other pawl $G^{13}$ with the stationary graduated bar $G^8$. In this way, the pointer is moved progressively to the left to indicate the thickness of each matrix passing to the assembling-channel and will therefore at any stage of the composition indicate the total measure of the assembled matrices. If desired, a bell or alarm (not shown) may be arranged to warn the operator as the line nears completion. After composition, the pointer slide is returned to starting position by disengaging the two pawls from their rack-teeth, a handle $G^{15}$ being provided for that purpose.

To perform the function above described, it is not necessary that the roller be power-driven as previously noted, but this arrangement is of advantage in that it overcomes any tendency of the matrices to stick or pile up in the receiving throat $C^3$, the roller of course serving to accelerate the matrices in their travel and to convey them positively through the receiving throat.

*The casting, clamping and justifying devices, etc.*—The casting mechanism (Figs. 2, 3, 4, 7, and 15), except as to the casting-channel H which will be dealt with under a separate heading, is substantially the same as heretofore, comprising the mold J, the melting-pot $J^1$ and the pump $J^2$, the mold being mounted in the rotatable wheel $J^3$ carried by the mold slide $J^4$. These parts are operated in the usual way from cams or wheels fixed to the main operating shaft $F^2$. Thus (Fig. 3), the mold wheel $J^3$ is moved facewise forwardly and backwardly through the connection of the slide $J^4$ with a cam-groove formed on the side face of the gear-wheel $J^5$, and is rotated intermittently through the pinion-shaft $J^6$ by the toothed sector plates $J^7$ on the wheel $J^8$; the melting-pot $J^1$ is rocked to and from the mold on the pivot rod $J^9$ under the influence of the cam $J^{10}$; and the pump $J^2$ is controlled in its operation by the cam $J^{11}$ acting through the pivoted double armed lever $J^{12}$. As well understood in the art, at each cycle of operation of the machine, the mold wheel $J^3$ is given a quarter rotation to present the mold J in a horizontal position and then advanced facewise to press the mold into firm engagement with the composed line which closes the mold slot at the front, the casting-pot $J^1$ thereafter being rocked forwardly to close the mold slot at the rear by the engagement of its mouthpiece with the rear face of the mold. With the parts in this condition (see Fig. 7), the pump $J^2$ is depressed and forces the molten metal into the mold, where it solidifies almost instantaneously to produce the slug or linotype.

While in casting position but before the casting operation, the composed line is locked up between the clamping jaws K, $K^1$, and properly justified by the bar L (Fig. 5), which parts are controlled from the main shaft $F^2$ in the customary manner,—the justifying bar L by the two cams $L^1$, $L^2$, acting through the spring-actuated levers $L^3$, $L^4$ and the vertical connecting rods $L^5$, $L^6$, respectively; and the clamping jaws through the link $K^2$ connected to the justifying lever $L^3$ (see also Figs. 2 and 3).

After the casting operation, the mold-wheel $J^3$ is given a three-quarters rotation to locate the mold J in a vertical position and again advanced facewise to present the mold with the contained slug before the customary trimming knives M (Fig. 5). In this position of the mold, an ejector blade (not shown) enters the mold slot from the rear and pushes the contained slug before it out of the mold, through the trimming knives and into the galley $M^1$, wherein it is advanced to the left by the stacking lever $M^2$ (see also Figs. 2 and 7). As is well known (Figs. 3 and 4), the ejector slide is connected by the link $M^3$ to the upright pivoted lever $M^4$ which is rocked forwardly by the lug $M^5$ on the previously mentioned gear wheel $J^5$ and rearwardly by a cam piece on the cam $E^4$, also previously referred to.

While the foregoing parts are of old construction and operate in the usual manner, it should be noted that their location has been entirely changed in accordance with this invention, which contemplates the arrangement of the various parts above and behind the magazine instead of below and to the left of the magazine, as in prior machines.

*The casting channel.*—The casting channel H (Figs. 6 and 7), like the assembling-channel C, is formed with matrix supporting rails $h$ and spacer supporting rails $h^1$, which rails are arranged to align with and form continuations of the corresponding rails $c$ and $c^1$ of the assembling-channel when the casting-channel is in registration therewith to receive the composed line therefrom.

The casting-channel H (Fig. 7) is carried by a slide $H^1$ movable forwardly and backwardly in horizontal guideways of the machine-frame so as to present the channel in the different positions before described. This slide $H^1$ (Fig. 15) is pivoted by pins or rods $H^2$ to the rear ends of links $H^3$, which at their forward ends are pivoted to arms $H^4$ radiating from a sleeve $H^5$ fast to a transverse rock-shaft $H^6$. The sleeve $H^5$ (Fig. 4), suitably journalled in the machine-frame, is provided at the right with a mutilated gear $H^7$ meshing with a vertical rack-bar $H^8$ connected to the forward end of a fore and aft lever $H^9$, which latter is journaled in the machine-frame, as at $H^{10}$, and has a rearwardly extending arm $H^{11}$ engaged with a suitably grooved cam $H^{12}$ on the main shaft $F^2$ (see also Fig. 3). As a result of this construction, when the machine is set into operation, the cam $H^{12}$ through the fore and aft lever $H^9$, depresses the rack-bar $H^8$, which by meshing with the gear $E^7$ turns the shaft $E^6$ and sleeve $E^5$ clockwise (when looking from the right of the machine), thereby causing the connecting links $H^3$ to push the slide $H^1$ rearwardly to carry the casting-channel H with the composed line into operative relation to the mold J as before mentioned. The casting channel is maintained in this position (Fig. 15) until the casting operation is completed, after which it is moved forwardly away from the mold and restored to its original receiving position, where it is allowed to remain until the spacers are separated from the line as will be later described. After the separation of the spacers, the casting channel is moved forwardly beyond its receiving position and into registration with the distributing channel R where it is again allowed to pause momentarily for the transfer of the matrices into such channel. Thereafter, it is restored to its original receiving position, and the parts then come to rest.

*The matrix alignment.*—When the composed line is in casting relation to the mold J, the lower ears on the character edges of the matrices X enter the groove $j$ formed in the front face of the mold, (Fig. 7). In this condition of the parts, the casting-channel H is raised slightly to lift the matrices and effect the alignment of their characters with the mold slot, such alignment being determined by the engagement of the matrix ears with the upper wall of the mold groove as usual. To effect this aligning action, the casting channel is formed on its front wall (Figs. 13 and 14) with two beveled surfaces $h^2$ engaged with cooperating beveled surfaces $h^3$ formed on the rear edge of the slide $H^1$, which latter is connected to the channel by means of a pair of screw bolts $h^4$ permitting a slight relative play between the parts. Consequently, when the mold is advanced against the matrix line, the casting-channel yields forwardly to a slight extent, causing the beveled or wedge-shaped surfaces to raise it sufficiently to effect the alignment of the matrices. Springs $h^5$ encircling the screw bolts are interposed between the channel H and the slide $H^1$ to cushion the movement of the channel and to maintain it in its lowered position at other times.

*Spacer separation and distribution.* — In the foregoing description, the casting-channel H has been considered as in one piece, but as a matter of fact, and to provide for the separation and distribution of the spacers W (Figs. 6 and 7), it is divided longitudinally into lower and upper sections $1^H$ and $2^H$, the former containing the matrix supporting rails $h$, and the latter the spacer supporting rails $h^1$. Normally the upper section $2^H$ is held in place upon the lower section $1^H$, so that, notwithstanding its divided form, the casting-channel is adapted to receive the composed line as it is transferred from the assembling-channel and then present it in operative relation to the mold in the manner before described. When, however, the casting-channel is restored to its receiving position after casting, the upper section $2^H$ is moved upwardly away from the lower section $1^H$, thereby lifting the spacers W from the composed line (see dotted lines in Fig. 6), and leaving the matrices X in the lower section. In the raised position of the upper section, its supporting rails $h^1$ register with horizontal extensions $B^9$ of the rails $B^1$ of the spacer magazine B, in which position of the parts the spacers are restored to the magazine by a transfer slide O. After the spacers are thus removed, the channel section $2^H$ is lowered into place upon the lower section $1^H$, which in the meantime has been restored to its original receiving position.

In providing for the foregoing operation of the upper channel section $2^H$ (Figs. 1 and 6), it is attached to a fore and aft horizontal bar N rectangular in cross-section and passing through a corresponding opening formed in the channel section at one end, it being obvious from this arrangement that the section is maintained at all times in a truly horizontal position and is capable of being slid back and forth in conjunction with the lower channeled section $1^H$ in the required manner. The bar N (Fig. 5) is carried by a vertically movable slide $N^1$ guided by an upright post $N^2$ and connected by a pin and slot connection to a long lever $N^3$ disposed transversely of the machine and fast to the forward end of a short fore and aft rock shaft or stud $N^4$ journalled in the framework. At its rear end, the rock shaft $N^4$ is provided with a shorter arm $N^5$ connected by a link $N^6$ to the forward end of a fore and aft lever $N^7$, which latter (Fig. 3) is journalled, as at $N^8$, in the machine-frame and has a rearwardly extending arm $N^9$ arranged to cooperate with the peripheral cam $E^4$ before referred to, it being understood that the cam is properly shaped to carry out the operation of the channel section $2^H$ in the manner above described.

The transfer slide O (Figs. 1 and 5) is supported upon a transverse bar or rail $O^1$ arranged back of the spacer-magazine B and is connected by a link $O^2$ to the upper end of an upright lever $O^3$ fast to the forward end of a fore and aft rock shaft $O^4$ journalled in the main frame. This rock shaft $O^4$ (Figs. 2 and 3) is provided at its rear end with a pair of inwardly projecting lugs $O^5$ and $O^6$, the former arranged to be engaged by a cam-piece $O^7$ carried by the wheel $J^8$ on the main shaft $E^2$, and the latter connected to a spring $O^8$, which restores the parts to their normal position after their operation by the cam-piece.

*The matrix distributing mechanism.*—The matrix distributor proper (Figs. 7 and 8) is located directly above the magazine A and consists as usual of the permuted bar or rail P and the rotary screws $P^1$, which latter traverse the matrices along the bar as they are delivered thereto. Overlying the receiving end of the bar P (Figs. 11, 12 and 15) is the distributing channel R, which latter is formed with a single set of supporting rails $r$, arranged to align with and form continuation of the matrix supporting rails $h$ of the casting-channel H when the latter is in registration with the distributing-channel.

The matrices are shifted from the casting-channel into the distributing-channel by a transfer slide S which pushes them along the supporting rails $r$ and presents them under yielding pressure to the action of a vertical reciprocating slide T by which they are detached one at a time from the line and delivered to the matrix distributor proper.

The transfer slide S (Figs. 7 and 11) is supported upon the upper edge of the distributor-bar P and is provided with a depending piece $S^1$ connected by a link $S^2$ to the upper end of a lever $S^3$. This lever (Figs. 2 and 5) is pivoted at its lower end, as at $S^4$, to the machine-frame and between its ends is connected by a pin and slot connection $S^5$ to an arm $S^6$ depending from a fore and aft spring-actuated rock shaft $S^7$ controlled in the usual way by the cam-piece $S^8$ on the justifying cam $L^1$. At the proper time, the slide S is moved to the right beyond the path of movement of the casting channel H, and then, when said channel is brought into registration with the distributing channel R, it is moved to the left through the connections described to carry out the proper transfer of the matrix line, maintaining a yielding pressure upon the matrix line so as to present the individual matrices one after another to the action of the detaching slide T. As shown more particularly in Figs. 11 and 12, the matrix detaching slide T is formed on its inner face with a rectangular notch or recess $T^1$ adapted to receive the body portion of a single matrix as it emerges from the distributing channel R, the entrance of more than one matrix in said notch being prevented by a thin lip or blade $T^2$ arranged to engage in the usual separating groove formed in the upper end of each matrix. The slide T is also provided with a pair of rocking pawls $T^3$ pivoted at $T^4$ to front and rear sides of the slide and having their upper ends terminating about midway of the matrix notch or recess $T^1$ so as to engage the leading face of the contained matrix, the pawls being maintained yieldingly in upright position by a blade spring $T^5$ attached to the inner face of the slide. At their lower ends and slightly above their pivotal points $T^4$, the pawls $T^3$ are formed with projecting lugs $T^6$ having their lower edges curved and their upper edges straight and horizontal. Arranged immediately below the left or receiving end of the distributor bar P is a fixed block $T^7$ disposed in contact with the slide T so as to assist in guiding the same and formed at its upper end with a curved track or surface $T^8$ leading upwardly toward the distributor-bar. On its front and rear sides, the block $T^7$ is provided with pendant pawls $T^9$ having their free ends arranged in position to engage the lugs or shoulders $T^6$ on the slide pawls $T^3$ and held yieldingly in this position by a blade spring $T^{10}$.

The operation of the parts is as follows: When the slide T assumes its upper position at each operation, the forward or leading matrix of the line is pressed into the notch $T^1$, the blade T acting to prevent the entrance of more than one matrix at a time. As the slide descends with the contained matrix, the lower curved edges of the pawl-lugs $T^6$ engage the free ends of the pendant block-pawls $T^9$ and displace the latter to the right, passing below the same. Then, as the slide begins its upward or return movement, the straight portions of the lugs $T^6$ become engaged with the free ends of the pawls $T^9$ which thereby rock the slide pawls $T^3$ to the right against the action of the blade spring $T^5$, ejecting the matrix from the notch $T^1$ and shifting it along the track $T^7$ into engagement with the conveying screws $P^1$ to be traversed thereby along the distributor-bar P and dropped therefrom at the proper point. With the matrix removed from the notch $T^1$, the slide T continues its upward movement to receive the next matrix from the distributing channel R, the pawls $T^3$ in the meantime being restored to their proper upright position by the spring $T^5$. It is pointed out that the slide T is extended upwardly beyond the notch $T^1$ to such extent as to close the exit end of the distributing-channel R when the slide is in its lower position and thereby hold back the matrix line within said channel until the slide returns to its upper position to receive the next leading matrix of the line.

The means herein employed for operating the reciprocating slide T (Figs. 2, 5 and 11) consist, on the one hand, of a spring $T^{11}$ attached to the lower end of the slide and pulling downwardly thereon from a fixed part of the machine, and on the other hand, of a cam or eccentric $T^{12}$ attached to one of the distributor screws $P^1$ and cooperating with a roller $T^{13}$ journalled on the upper end of the slide, whereby the to and fro movement of the slide is effected at each rotation of the distributor screw.

It remains to be described how the non-type forming matrices Y and Z are distributed. It has already been stated that these matrices, like the type-forming matrices X, are discharged into the assembling-channel C as they are brought to that level, but that, being without upper ears, they pass through such channel and drop into the underlying chute Q. This common or main chute Q (Figs. 8 and 10) has extending therefrom two branch chutes $Q^1$ and $Q^2$ the former leading back to the magazine-channel containing the matrices Y, and the latter to the magazine-channel containing the matrices Z. The delivery of the matrices Y and Z into the proper branch chute is controlled by means of a switch $Q^3$ located in the main chute and fixed to a short shaft $Q^4$ having an arm $Q^5$ connected to the lower end of the rod $D^5$ before referred to. Under this arrangement, therefore, and due to the action of the spring $D^8$ which maintains the rod $D^5$ normally depressed, the switch $Q^3$ is held normally in the position shown by full lines in Fig. 10 to establish communication between the main chute A and the branch chute $Q^1$. Hence, during the composition of a line, the spacer releasing matrices Y (which do not act upon the rod $D^5$) will be deflected immediately by the switch $Q^3$ into their appropriate branch chute and restored to their magazine-channel. On the other hand, when the rod $D^5$ is raised by a matrix Z (which controls the release of the line transfer device D), the switch $Q^3$ is turned to the position indicated by the dotted lines in Fig. 10 to establish communication between the main chute Q and the branch chute $Q^2$, so that such matrix upon falling into the main chute is immediately deflected into its appropriate branch chute and restored to the proper magazine-channel. Since, after the transfer of the composed line, the rod $D^5$ is again depressed by the spring $D^8$, the switch $Q^3$ is caused to resume its original position for directing the spacer releasing matrices Y of the next line into the branch chute $Q^1$.

*The driving connections.*—It has been made clear in the foregoing description that the main cam-shaft $F^2$ controls the operation of all of the periodcally operated parts of the machine, making one complete rotation at each cycle of operation of the machine as well known. Certain parts of the machine, however, are driven constantly and independently of the main shaft and the driving connections to these parts will now be described.

As shown in Figs. 3 and 4, the continuously rotating pulley F is connected by a belt $F^3$ to a pulley $F^4$ fast to a transverse drive shaft $F^5$ corresponding to the so-called "intermediate shaft" of the regular linotype machine. This intermediate shaft $F^5$ is provided with three small pulleys $F^6$, $F^7$, and $F^8$, respectively. The pulley $F^6$ is connected by a belt $F^9$ to a similar pulley $F^{10}$ fixed to an extension of one of the distributor screws $P^1$, which latter (Fig. 9) are connected together and driven in unison by the gears $P^2$. The matrix distributor is thus caused to operate continuously as in the regular linotype machine.

The intermediate pulley $F^7$ is connected by a belt $F^{11}$ to a similar pulley $F^{12}$ fast to one end of a transverse stub shaft $F^{13}$ (Figs. 1 and 2). At and near its opposite end (Fig. 17), the stub shaft $F^{13}$ is provided with two bevel gears $F^{14}$ and $F^{15}$, the former meshing with a complementary gear $F^{16}$ secured to the rear end of the pulley shaft $G^2$, before referred to, and the latter meshing with a complementary gear $F^{17}$ secured to the upper end of a vertical shaft $F^{18}$. At its lower end, the vertical shaft $F^{18}$ is provided with a further bevel gear $F^{19}$ meshing with a complementary gear $F^{20}$ secured to a shaft $F^{21}$ which carries the lower pulley $C^7$ of the conveyor belt $C^5$. Through these connections, the two assembling belts $C^2$ and $C^5$ are constantly operated, so that the composition of the matrices may be carried on continuously and independently of the operation of the other parts of the machine. In this connection, it will be remembered that the upper pulley $C^6$ is in constant driving connection with the gear $D^3$ and hence the latter is also continuously operated as before mentioned.

The pulley $F^8$ (Fig. 1) is connected by a belt $F^{22}$ to a similar pulley $F^{23}$ fixed to an extension of one of the keyboard rolls $A^5$, which latter (Fig. 4) are connected together and operated in unison by the gearing $A^7$ as usual. These keyboard rolls, therefore, are also caused to rotate continuously to effect the release of the matrices from the magazine under the control of the keyboard $A^6$ independently of the operation of the other parts.

*General comments.*—As before noted, the present machine as organized not only presents a simplified and compact arrangement of the parts, but materially reduces the time consumed in the circulation of the matrices through the machine, the arrangement being such that the matrices may be transferred from the assembling to the distributing point by the shortest possible path and with the minimum number of movements. As a result, the matrices are subjected to little wear and hence their life is appreciably prolonged. In addition, the speed of distribution is considerably increased, and particularly when, as in the present machine, the matrices are presented to the distributor in the same order in which they are composed in line. Furthermore by reducing the time consumed in the circulation of the matrices, more time may be devoted to the casting operation, which is especially desirable for display work or the like requiring the use of large and heavy slugs. There are many other features of advantage, but it seems unnecessary to discuss them at length, as they will be readily appreciated by those skilled in the art.

Having thus described my invention, its construction and mode of operation, what I claim and desire to secure by Letters Patent of the United States is as follows:

1. In a typographical machine, the combination of a matrix magazine, means for releasing the matrices therefrom, and mechanism for assembling the released matrices in line, the said mechanism including elevating means for carrying the matrices to their place of assemblage.

2. In a typographical machine, the combination of a matrix magazine, means for releasing the matrices therefrom, and mechanism for assembling the released matrices in line, the said mechanism including an elevated assembling channel wherein the line is composed, and means for carrying the matrices upwardly to the assembling channel.

3. In a typographical machine, the combination of a matrix magazine, means for releasing the matrices therefrom, and mechanism for assembling the released matrices in line, the said mechanism including an elevated assembling channel wherein the line is composed, and an endless conveyor belt for carrying the matrices upwardly to the assembling channel.

4. In a typographical machine, the combination of a matrix magazine, means for releasing the matrices therefrom, and mechanism for assembling the released matrices in line, the said mechanism including an elevated assembling channel wherein the line is composed, a vertically disposed chute leading upwardly to the assembling channel, and an endless conveyor belt having one stretch portion running through said chute and provided with matrix engaging elements arranged to pick up the matrices one after another and carry them upwardly along the chute to the assembling channel.

5. In a typographical machine, the combination of a matrix magazine, means for releasing the matrices therefrom, and mechanism for assembling the released matrices in line, the said mechanism including an elevated assembling channel wherein the line is composed, means for carrying the matrices upwardly to the assembling channel, and means located at the entrance to the assembling channel for discharging the matrices thereinto as they are brought to that level by the elevating means.

6. In a typographical machine, the combination of a matrix magazine, means for releasing the matrices therefrom, and mechanism for assembling the released matrices in line, the said mechanism including an elevated assembling channel wherein the line is composed, an endless conveyor belt for carrying the matrices upwardly to the assembling channel, and a reciprocating pusher located at the entrance to the assembling channel and operated automatically to discharge the matrices thereinto as they are brought to that level by the conveyor belt.

7. In a typographical machine, the combination of a matrix magazine, means for releasing the matrices therefrom, and mechanism for assembling the released matrices in line, the said mechanism including an elevated assembling channel wherein the line is composed, a vertically disposed chute leading upwardly to the assembling channel, an endless conveyor belt having one portion running through said chute and provided with matrix engaging elements arranged to pick up the matrices one after another and carry them upwardly along the chute to the assembling channel, and a reciprocating pusher operated in timed relation to the conveyor belt for discharging the matrices into the assembling channel as they are successively brought to that level.

8. Assembling mechanism for typographical machines including, in combination, an assembling channel wherein the matrices are composed in line, a conveyor belt for carrying the matrices to said channel, a pair of pulleys over which the conveyor belt travels, one of said pulleys being formed with a projecting stud, and a matrix pusher located at the entrance to said assembling channel and arranged to be engaged and operated by said projecting stud.

9. Assembling mechanism for typographical machines including, in combination, an assembling channel wherein the matrices are composed in line, an endless conveyor belt for carrying the matrices to said channel and formed with a series of matrix engaging elements, and a matrix pusher located at the entrance to the assembling channel and movable into said channel as each matrix engaging element arrives at the entrance thereto.

10. Assembling mechanism for typographical machines including, in combination, an assembling channel wherein the matrices are composed in line, a chute leading to said channel, an endless conveyor belt having one stretch portion running through said chute and formed with a series of matrix engaging elements, a matrix pusher located at the entrance to the assembling channel, and means for advancing said pusher into the assembling channel as each matrix engaging element arrives at the entrance thereto.

11. In a typographical machine, the combination of a matrix magazine, means for releasing the matrices therefrom, means for directing the released matrices to a common point including a throat through which the matrices are discharged, an elevated assembling channel wherein the matrices are composed in line, and means to receive the matrices as they issue from the discharge throat and carry them upwardly to the assembling channel.

12. In a typographical machine, the combination of a matrix magazine, means for releasing the matrices therefrom, means for directing the released matrices to a common point including a throat through which the matrices are discharged, an elevated assembling channel wherein the matrices are composed in line, a vertically arranged chute leading from the discharge throat to the assembling channel, and an endless conveyor belt having one stretch portion running through said chute and formed with a series of matrix engaging elements adapted to pick up the matrices as they issue from the throat and carry them upwardly through the chute to the assembling channel.

13. In a typographical machine, the combination of a matrix magazine, means for releasing the matrices from the magazine, means for directing the released matrices to a common point including a downwardly inclined conveyor belt, an elevated assembling channel wherein matrices are composed in line, and a vertically arranged conveyor belt arranged to receive the matrices from the inclined belt and carry them upwardly to the assembling channel.

14. In a typographical machine, the combination of a matrix magazine, means for releasing the matrices therefrom, means for directing the released matrices to a common point including a throat through which the matrices are discharged, an elevated assembling channel wherein the matrices are composed in line, means to receive the matrices from the discharge throat and carry them upwardly to the assembling channel, and means arranged within said throat and acting to insure the delivery of the matrices to the elevating means.

15. In a typographical machine, the combination of a matrix magazine, means for releasing the matrices therefrom, means for directing the released matrices to a common point including a throat through which the matrices are discharged, an elevated assembling channel wherein the matrices are composed in line, a vertically arranged chute leading from the discharge throat to the assembling channel, an endless conveyor belt having one stretch portion running through said chute and formed with a series of matrix engaging elements adapted to pick up the matrices as they issue from the discharge throat and carry them upwardly through the chute to the assembling channel, and a deflector acting to position the matrices as they issue from the discharge throat in the path of the engaging elements on the conveyor belt.

16. In a typographical machine, the combination of a matrix magazine, means for releasing the matrices therefrom, means for directing the released matrices to a common point including a downwardly inclined conveyor belt and a throat through which the matrices are discharged, an elevated assembling channel wherein the matrices are composed in line, a vertically arranged chute leading from the discharge throat to the assembling channel, an endless conveyor belt having one stretch portion running through said chute and formed with a series of matrix engaging elements adapted to pick up the matrices as they issue from the discharge throat and carry them upwardly through the chute to the assembling channel, a deflector arranged within the discharge throat and acting to position the matrices as they issue therefrom in the path of the engaging elements on the conveyor belt, and a reciprocating pusher located at the entrance to the assembling channel and acting to discharge the matrices thereinto as they are brought to that level by the conveyor belt.

17. In a typographical machine, the combination of a matrix magazine, means for releasing the matrices therefrom, means for directing the released matrices to a common point including a throat through which the matrices are discharged, an assembling channel located above the magazine and wherein the matrices are composed in line, means to receive the matrices as they issue from the discharge throat and carry them upwardly to the assembling channel, a calipering device having a movable feeler member located within the throat to measure the thickness of each matrix as it passes therethrough, and an indicator operated by said feeler member.

18. In a typographical machine, the combination of a matrix magazine, means for releasing the matrices therefrom, means for directing the released matrices to a common point including a throat through which the matrices are discharged, an assembling channel wherein the matrices are composed in line, means to receive the matrices as they issue from the discharge throat and carry them to the assembling channel, and power-actuated means acting to force the matrices through the discharge throat.

19. In a typographical machine, the combination of a matrix magazine, means for releasing the matrices therefrom, means for directing the released matrices to a common point including a throat through which the matrices are discharged, an assembling channel wherein the matrices are composed in line, means to receive the matrices as they issue from the discharge throat and carry them to the assembling channel, and a power-driven roll arranged within the discharge throat and acting by its rotation to force the matrices therethrough.

20. In a typographical machine equipped with type-forming and non-type-forming matrices, the combination of means for releasing said matrices from their places of storage, an elevated assembling channel wherein the type-forming matrices are composed in line and through which the nontype-forming matrices pass without composition, and means for carrying said matrices upwardly as they are released and delivering them to the assembling channel, with a spacer-magazine arranged adjacent the assembling channel, and means for delivering the spacers to the assembling channel, the said means being controlled by the non-type-forming matrices as they are carried upwardly by the elevating means.

21. In a typographical machine equipped with type-forming and non-type-forming matrices, the combination of means for releasing said matrices from their places of storage, an elevated assembling channel wherein the type-forming matrices are composed in line and through which the non-type-forming matrices pass without composition, and means for carrying said matrices upwardly as they are released and delivering them to the assembling-channel, with a spacer-magazine arranged adjacent the assembling-channel, means actuated by the non-type-forming matrices as they are carried upwardly by the elevating means for delivering spacers from said magazine to the assembling-channel, and means arranged to receive said non-type-forming matrices as they subsequently pass through the assembling-channel and return them to their place of storage.

22. In a typographical machine equipped with type-forming and non-type-forming matrices, the combination of means for releasing said matrices from their places of storage, an elevated assembling-channel wherein the type-forming matrices are composed in line and through which the non-type-forming matrices pass without composition, and an endless conveyor belt for carrying said matrices upwardly as they are released and delivering them to the assembling-channel, with a spacer-magazine arranged above the assembling-channel and having a chute through which the released spacers pass to said channel, an escapement controlling the release of the spacers, and an actuating member for said escapement having a part arranged in position to be engaged by the non-type-forming matrices as they are carried upwardly by the conveyor belt.

23. In a typographical machine equipped with justifying spacers and with matrices of two different forms, the combination of means for assembling matrices of one form in line, and means for assembling spacers in line therewith, the latter means being controlled by matrices of the other form.

24. In a typographical machine equipped with matrices of two different forms, the combination of means for releasing said matrices from their places of storage, means for carrying the released matrices through the machine, an assembling-channel into which matrices of one form are discharged and composed in line, a spacer-magazine arranged adjacent the assembling channel, and means controlled by matrices of the other form for delivering the spacers to the assembling-channel.

25. In a typographical machine equipped with type-forming and non-type-forming matrices, the combination of means for releasing said matrices from their places of storage, an assembling-channel wherein the type-forming matrices are composed in line and through which the non-type-forming matrices pass without composition, and means for delivering matrices of both kinds to the assembling-channel, with a spacer-magazine arranged adjacent the assembling-channel, and means controlled by the non-type-forming matrices in their travel through the machine for delivering the spacers to the assembling-channel.

26. In a typographical machine equipped with type-forming and non-type-forming matrices, the combination of means for releasing said matrices from their places of storage, an assembling-channel wherein the type-forming matrices are composed in line and through which the non-type-forming matrices pass without composition, means for delivering matrices of both kinds to the assembling-channel, and means to receive the non-type-forming matrices as they pass from the assembling channel and return them to their places of storage, with a spacer-magazine arranged adjacent the assembling-channel, and means controlled by the non-type-forming matrices in their circulation through the machine for delivering the spacers into the assembling-channel.

27. In a typographical machine equipped with type-forming and non-type-forming matrices, the combination of means for releasing said matrices from their places of storage, an elevated assembling-channel wherein the type-forming matrices are composed in line and through which the non-type-forming matrices pass without composition, and means for carrying said matrices upwardly as they are released and delivering them to said channel, with a transfer device for removing the composed line from the assembling-channel, and operating means therefor, the said means being rendered active by the non-type-forming matrices as they are carried upwardly by the elevating means.

28. In a typographical machine equipped with type-forming and non-type-forming matrices, the combination of means for releasing said matrices from their places of storage, an elevated assembling-channel wherein the type-forming matrices are composed in line and through which the non-type-forming matrices pass without composition, and means for carrying said matrices upwardly as they are released and delivering them to said channel, with a transfer device for removing the composed line from the assembling-channel, operating means therefor rendered active by the non-type-forming matrices as they are carried upwardly by the elevating means, and means arranged to receive said non-type-forming matrices as they subsequently pass from the assembling-channel and return them to their place of storage.

29. In a typographical machine equipped with type-forming and non-type-forming matrices, the combination of means for releasing said matrices from their places of storage, an elevated assembling-channel wherein the type-forming matrices are composed in line and through which the non-type-forming matrices pass without composition, and an endless conveyor belt for carrying said matrices upwardly as they are released and delivering them to the assembling-channel, with a transfer device to remove the composed line from the assembling-channel, and operating means therefor including a controlling member arranged in position to be engaged and actuated by the non-type-forming matrices as they are carried upwardly by the conveyor belt.

30. In a typographical machine equipped with matrices of two different forms, the combination of means for composing matrices of one form in line, and means for transferring the composed line to a different part of the machine, the said transfer means being controlled by matrices of the other form.

31. In a typographical machine equipped with type-forming and non-type-forming matrices, the combination of means for releasing said matrices from their places of storage, an assembling-channel wherein the type-forming matrices are composed in line and through which the non-type-forming matrices pass without composition, and means for delivering matrices of both kinds to the assembling-channel, with a transfer device to remove the composed line from the assembling-channel, and operating means therefor controlled by the non-type-forming matrices in their travel through the machine.

32. In a typographical machine equipped with type-forming and non-type-forming matrices, the combination of means for releasing said matrices from their places of storage, an assembling-channel wherein the type-forming matrices are composed in line and through which the non-type-forming matrices pass without composition, means for delivering matrices of both kinds to the assembling-channel, and means to receive the non-type-forming matrices as they pass from the assembling-channel and return them to their places of storage, with a transfer device to remove the composed line from the assembling-channel, and operating means therefor controlled by the non-type-forming matrices in their circulation through the machine.

33. In a typographical machine, the combination of an assembling-channel wherein the matrices are composed in line, a transfer device to remove the composed line therefrom, means for effecting the line transfer movement of said device, and a matrix-actuated member controlling the operation of said means.

34. In a typographical machine, the combination of an assembling-channel wherein the matrices are composed in line, a transfer device to remove the composed line therefrom, means for effecting the line transfer movement of said device, a matrix-actuated member controlling the operation of said means, and means for restoring the transfer device to its original position after it has completed its transfer movement.

35. In a typographical machine, the combination of an assembling-channel wherein the matrices are composed in line, a transfer device to remove the composed line therefrom, constantly-operated means for effecting the line transfer movement of said device and normally disconnected therefrom, and a controlling member actuatable to make such connection in effecting the line transfer.

36. In a typographical machine, the combination of an assembling-channel wherein the matrices are composed in line, a transfer device to remove the composed line therefrom, constantly-operated means for effecting the line transfer movement of said device and normally disconnected therefrom, and a matrix-actuated member to effect such connection of the parts.

37. In a typographical machine, the combination of an assembling-channel wherein the matrices are composed in line, a transfer device to remove the composed line therefrom, constantly-operated means for effecting the line transfer movement of said device and normally disconnected therefrom, a controlling member actuatable to make such connection in effecting the line transfer, means for breaking such connection when the transfer device has completed its transfer movement, and means for thereafter restoring said transfer device to its original position.

38. In a typographical machine, the combination of an assembling-channel wherein the matrices are composed in line, a transfer device to remove the composed line therefrom, constantly-operated means for effecting the line transfer movement of said device and normally disconnected therefrom, a controlling member actuatable to make such connection in effecting the line transfer, means for breaking such connection when the transfer device has completed its transfer movement, means for thereafter restoring said transfer device to its original position, and devices operated by the return of the line transfer device to initiate the operation of the machine.

39. In a typographical machine, the combination of an assembling-channel wherein the matrices are composed in line, a transfer device to remove the composed line therefrom, mechanism for effecting the line transfer movement of said device and for subsequently restoring it to its original position, and devices actuated by the return movement of the transfer device to initiate the operation of the machine.

40. In a typographical machine, the combination of an assembling-channel wherein the matrices are composed in line, a transfer device normally arranged out of said channel and movable thereinto behind the last composed matrix, constantly-operated means adapted to be connected to said transfer device as it is moved into the assembling-channel and acting when so connected to effect the line transfer movement thereof, and mechanism whereby the transfer device is moved out of the assembling-channel upon the completion of its transfer movement and then restored to its original position.

41. In a typographical machine, the combination of an assembling-channel wherein the matrices are composed in line, a transfer device normally arranged out of said channel and movable thereinto behind the last composed matrix, constantly-operated means adapted to be connected to said transfer device as it is moved into the assembling-channel and acting when so connected to effect the line transfer movement thereof, means for withdrawing the transfer device from the assembling-channel and breaking its connection with the operating means upon the completion of its line transfer movement, and separate means for thereafter restoring the transfer device to its original position.

42. In a typographical machine, the combination of an assembling-channel wherein the matrices are composed in line, a transfer device to remove the composed line therefrom, and matrix-actuated means controlling the line transfer movement of said device.

43. In a typographical machine, the combination of an assembling-channel wherein the matrices are composed in line, a transfer device to remove the composed line therefrom, matrix-actuated means controlling the line transfer movement of said device, and devices controlled by the transfer device to initiate the operation of the machine.

44. In a typographical machine equipped with type-forming matrices and with non-type-forming matrices of two different forms, the combination of means for releasing said matrices from their places of storage, an elevated assembling-channel wherein the type-forming matrices are composed in line and through which the non-type-forming matrices of both forms pass without composition, and conveyor means for carrying said matrices upwardly as they are released and delivering them to the assembling-channel, with a spacer-magazine arranged adjacent the assembling-channel and means controlled by the non-type-forming matrices of one form as they are carried upwardly by the conveyor means for delivering the spacers to the assembling-channel, together with a line transfer device for removing the composed line from the assembling-channel, and operating means therefor rendered active by the non-type-forming matrices of the other form as they are carried upwardly by the conveyor means.

45. In a typographical machine equipped with matrices of three different forms, the combination of means for releasing said matrices from their places of storage, means for carrying the released matrices through the machine, an assembling-channel into which matrices of the first form are discharged and composed in line, a spacer-magazine arranged adjacent said channel, means controlled by matrices of the second form for delivering the spacers to the assembling-channel, a transfer device for removing the composed line from the assembling-channel, and operating means therefor controlled by matrices of the third form.

46. In a typographical machine equipped with type-forming matrices and with non-type-forming matrices of two different forms, the combination of means for releasing said matrices from their places of storage, an assembling-channel wherein the type-forming matrices are composed in line and through which the non-type-forming matrices of both forms pass without composition, means for delivering said matrices to the assembling-channel, and means arranged to receive and separate the non-type-forming matrices as they pass from the assembling-channel and return them to their respective places of storage, with a spacer-magazine arranged adjacent the assembling-channel, and means controlled by non-type-forming matrices of one form in their circulation through the machine for delivering the spacers to the assembling-channel, together with a transfer device to remove the composed line from the assembling-channel, and operating means therefor controlled in their operation by non-type-forming matrices of the other form in their circulation through the machine.

47. In a typographical machine equipped with justifying spacers and with matrices of different form, the combination of means for assembling matrices of one form in line, means controlled by matrices of another form for introducing the justifying spacers into the line in course of composition, and means controlled by matrices of still another form for transferring the line after composition to a different part of the machine.

48. In a typographical machine equipped with type-forming matrices and with non-type-forming matrices of different form as well as justifying spaces, the combination of means for assembling the type-forming matrices and justifying spacers in line, spacer releasing means controlled by the non-type forming matrices of one form, a line transfer device controlled by the non-type-forming matrices of another form, and mechanism for circulating the non-type-forming matrices through the machine to effect the operation of said parts at the proper time, the said mechanism including means for separating said matrices according to form after they have performed their functions and return them to their respective places of storage.

49. In a typographical machine equipped with non-type-forming matrices of different form, the combination of spacer releasing means controlled by matrices of one form, a line transfer device controlled by matrices of another form, and mechanism for circulating the matrices through the machine to effect the operation of said parts at the proper time, said mechanism including a main chute into which the matrices of both forms are discharged at one point of their travel, two branch chutes leading therefrom to the respective places of storage of said matrices, and a switch to direct the matrices into one or the other of the branch chutes according to form.

50. In a typographical machine equipped with non-type-forming matrices of different form, the combination of a spacer-magazine provided with an escapement to control the release of spacers therefrom, a member actuated by matrices of one form in their travel through the machine to operate the spacer releasing escapement, a line transfer device, means for effecting the transfer movement of said device, a member actuated by matrices of another form for initiating the operation of said means, and mechanism for circulating the matrices through the machine to carry out the above operations, said mechanism including a main chute into which matrices of both forms are discharged at one point of their travel, two branch chutes leading therefrom to the respective places of storage of said matrices, and a switch operated by the controlling member for the line transfer device and acting to direct the matrices from the main chute into one or the other of the branch chutes according to the position of the switch as governed by said controlling member.

51. In a typographical casting machine, the combination of a slotted mold, a movable casting-channel to present the composed line in engagement with the mold, and means actuated by the presenting movement of said channel for lifting it slightly relatively to the mold to effect the proper alignment of the matrices therewith.

52. In a typographical casting machine, the combination of a slotted mold, a casting channel wherein the composed line is supported, a carrier for said channel movable to present the composed line in engagement with the mold, and wedge shaped connections between the carrier and the casting-channel for lifting the latter slightly when the composed line is engaged with the mold to effect the proper alignment of the matrices therewith.

53. In a typographical casting machine, the combination of a slotted mold, a casting channel wherein the composed line is supported, a slide carrying the casting-channel and movable horizontally to present the composed line in engagement with the mold, and wedge-shaped connections between the slide and the casting-channel for lifting the latter slightly when the composed line is engaged with the mold to effect the proper alignment of the matrices therewith.

54. In a typographical casting machine, the combination of a slotted mold, a cooperating casting-channel wherein the composed line is supported and movable as a whole to and from casting position, the said channel comprising a matrix supporting section and a separate spacer supporting section, and means for moving said sections apart after the casting operation to effect the separation of the matrices and spacers of the composed line.

55. In a typographical casting machine, the combination of a slotted mold, a cooperating casting-channel wherein the composed line is supported and movable as a whole to and from casting position, the said channel comprising a matrix supporting section and a separate spacer supporting section, and means for moving said sections into and out of operative relation to each other before and after each casting operation.

56. In a typographical casting machine, the combination of a slotted mold, a cooperating casting-channel wherein the composed line is supported and movable as a whole to and from casting position, the said channel being divided longitudinally into a lower matrix supporting section and an upper spacer supporting section, and means for moving said sections apart in a vertical direction to draw the spacers longitudinally from the composed line, 57. In a typographical casting machine, the combination of a slotted mold, a cooperating casting-channel wherein the composed line is supported and movable as a whole to and from casting position, the said channel being divided longitudinally into a lower matrix supporting section and an upper spacer supporting section, and means for moving the spacer supporting section vertically into and out of operative relation to the matrix supporting section before and after each casting operation.

58. In a typographical casting machine, the combination of slotted mold, a cooperating casting-channel wherein the composed line is supported and movable as a whole to and from casting position, the said channel comprising a matrix supporting section and a separate spacer supporting section, and means for moving said sections apart after the casting operation to effect the separation of the matrices and spacers of the composed line, with transfer devices for removing the matrices and spacers from their respective supporting sections in their separated condition.

59. In a typographical casting machine, the combination of a slotted mold, a cooperating casting-channel wherein the composed line is supported and movable as a whole to and from casting position, the said channel comprising a matrix supporting section and a separate spacer supporting section, and means for moving said sections into and out of operative relation to each other before and after each casting operation, with transfer devices for removing the matrices and spacers from their respective supporting sections in their separated condition.

60. In a typographical casting machine, the combination of a slotted mold, a casting-channel wherein the composed line is supported and movable horizontally to and from casting position, the said channel being divided longitudinally into a lower matrix supporting section and an upper spacer supporting section, and means for moving the spacer supporting section vertically away from the matrix supporting section in the retracted position of the casting-channel, with a spacer-magazine arranged above the casting channel in position to cooperate with the spacer supporting section in its raised condition, and a transfer device for carrying the spacers from their supporting section into the magazine when said parts are in cooperative relation.

61. In a typographical casting machine, the combination of a slotted mold, a casting-channel wherein the composed line is supported and movable horizontally to and from casting position, the said channel being divided longitudinally into a lower matrix supporting section and an upper spacer supporting section, and means for raising and lowering the matrix supporting section relatively to the matrix supporting section in the retracted position of the casting-channel, with a spacer-magazine arranged above the casting-channel in position to cooperate with the spacer supporting section in its raised condition, and a transfer device for shifting the spacers from the supporting section into the magazine when said parts are in cooperative relation.

62. A matrix distributing mechanism including, in combination, a distributor-bar and its matrix conveying devices, a distributing-channel arranged above the receiving end of the distributor-bar, and means for feeding the matrices one at a time from the distributing channel to the distributor-bar, the said means including a vertical reciprocating slide formed with a holding notch or recess adapted in the upper position of the slide to receive a matrix from the distributing channel and in the lower position of the slide to locate said matrix in engaging relation to the distributor-bar.

63. A matrix distributing mechanism including, in combination, a distributor-bar and its matrix conveying devices, a distributing-channel arranged above the receiving end of the distributor-bar, and means for feeding the matrices one at a time from the distributing-channel to the distributor-bar, the said means including a vertical reciprocating slide formed with a holding notch or recess adapted in the upper position of the slide to receive a matrix from the distributing-channel and in the lower position of the slide to locate said matrix in engaging relation to the distributor-bar, and an ejector to remove the matrix from the holding notch or recess in the lower position of the slide.

64. A matrix distributing mechanism including, in combination, a distributor-bar and its matrix conveying devices, a distributing-channel arranged above the receiving end of the distributor-bar, and means for feeding the matrices one at a time from the distributing-channel to the distributor-bar, the said means including a vertical reciprocating slide formed with a holding notch or recess adapted in the upper position of the slide to receive a matrix from the distributing channel and in the lower position of the slide to locate said matrix in engaging relation to the distributor-bar, and a pair of rocking pawls carried by the slide and actuated in the lower position thereof to remove the matrix from the holding notch or recess.

65. A matrix distributing mechanism including, in combination, a distributor-bar and its matrix conveying devices, a distributing-channel arranged above the receiving end of the distributor-bar, and means for feeding the matrices one at a time from the distributing channel to the distributor-bar, the said means including a vertical reciprocating slide formed with a holding notch or recess adapted in the upper position of the slide to receive a matrix from the distributing channel and in the lower position of the slide to locate said matrix in engaging relation to the distributor-bar, an ejector to remove the matrix from the holding notch in the lower position of the slide and a fixed block underlying the receiving end of the bar and formed with an upwardly inclined track to guide the ejected matrix onto the distributor-bar.

66. A matrix distributing mechanism including, in combination, a distributor-bar and its matrix conveying devices, a distributing-channel arranged above the receiving end of the distributor-bar, and means for feeding the matrices one at a time from the distributing channel to the distributor-bar, the said means including a vertical reciprocating slide formed with a holding notch or recess adapted in the upper position of the slide to receive a matrix from the distributing channel and in the lower position of the slide to locate said matrix in engaging relation to the distributor-bar, a pair of rocking pawls carried by the slide and actuated in the lower position thereof to eject the matrix from the holding notch or recess, a fixed block underlying the receiving end of the distributor-bar and formed with an upwardly inclined track to guide the ejected matrix onto the distributor-bar, and a further pair of pawls attached to the fixed block and arranged to engage and actuate the slide pawls at the proper time.

67. Matrix distributing mechanism including, in combination, a distributor-bar, means for conveying the matrices along said bar in one direction, a distributing-channel leading to the distributor-bar and constructed to support the matrices side by side in line, a transfer device for shifting the matrices therethrough in a direction opposite to that of their travel along the distributor-bar, and means for feeding the matrices one at a time from the distributing channel to the distributor-bar.

68. Matrix distributing mechanism including, in combination, a distributor-bar and its matrix conveying devices, a distributing channel leading to the distributor-bar and located above and between the ends thereof, and means for feeding the matrices from the distributing channel to the distributor-bar.

69. Matrix distributing mechanism including, in combination, a distributor-bar and its matrix conveying devices, a distributing channel arranged above the distributor-bar and between the ends thereof, means for shifting the matrices through the distributing channel in a direction opposite to that in which they are carried along the distributor-bar, and devices for feeding the matrices one at a time from the distributing channel to the distributor-bar.

70. In a typographical machine, the combination of a matrix magazine, means for releasing the matrices therefrom, mechanism for assembling the released matrices in line, mechanism for casting a slug from the assembled line, and distributing mechanism for restoring the matrices after casting to the magazine, the said casting and distributing mechanisms being arranged in cooperative relation above and within the lateral limits of the magazine.

71. In a typographical machine equipped with a matrix magazine, the combination of assembling, casting, and distributing mechanisms, and means for transferring the successive assembled lines as a whole from one mechanism to another, the said casting and distributing mechanisms being arranged in close proximity to each other above and within the lateral limits of the magazine.

72. In a typographical machine, the combination of a matrix magazine, means for releasing the matrices therefrom, mechanism for carrying the released matrices upwardly and assembling them in line above the magazine, and casting mechanism arranged above the magazine in position to cooperate with the assembled line.

73. In a typographical machine, the combination of a matrix magazine, means for releasing the matrices therefrom, mechanism for carrying the released matrices upwardly and assembling them in line above the magazine, and casting and distributing mechanisms arranged above the magazine in positions to cooperate with the assembled line.

74. In a typographical machine, the combination of a matrix magazine, means for releasing the matrices therefrom, mechanism for carrying the released matrices upwardly and assembling them in line above the magazine, casting mechanism arranged in close proximity to the place of assemblage, distributing mechanism arranged in close proximity to the place of casting, and means for transferring the assembled line first to the casting mechanism and then to the distributing mechanism.

75. In a typographical machine equipped with a matrix magazine, the combination of mechanism for assembling the matrices in line, mechanism for casting a slug from the assembled line, and mechanism for distributing the matrices of the assembled line into the proper channels of the magazine, the said mechanisms being constructed and arranged to present the assembling, casting, and distributing positions above the magazine.

76. In a typographical machine equipped with a matrix magazine, the combination of mechanism for assembling the matrices in line, mechanism for casting a slug from the assembled line, and mechanism for distributing the matrices of the assembled line into the proper channels of the magazine, the said mechanisms being constructed and arranged to present the assembling, casting, and distributing positions of the line in close proximity to each other above the magazine.

77. In a typographical machine equipped with a matrix magazine, the combination of assembling mechanism including an assembling-channel arranged above the magazine and wherein the line is composed, casting mechanism including a casting channel arranged to receive the composed line directly from the assembly channel, and distributing mechanism including a distributing channel arranged to receive the matrices of the composed line directly from the casting channel.

78. In a typographical composing, casting and distributing machine, the combination of a matrix magazine, and assembling, casting and distributing channels arranged in cooperative relation above the magazine.

79. In a typographical composing, casting and distributing machine, the combination of a matrix magazine, and assembling, casting and distributing channels arranged in cooperative relation above the magazine, with means for transferring the composed line first from the assembling to the casting channel and then from the casting to the distributing channel.

80. In a typographical composing, casting and distributing machine, the combination of a matrix magazine, and assembling, casting and distributing channels arranged at a common level above the magazine in position to receive the composed line directly from one another.

81. In a typographical composing, casting and distributing machine, the combination of a matrix magazine, and assembling, casting and distributing channels arranged at a common level above the magazine, the assembling and distributing channels being fixed, and the casting channel movable horizontally into registration with the two fixed channels alternately.

82. In a typographical casting and distributing machine equipped with a matrix magazine, the combination of a casting channel wherein the line is supported during casting, and a distributing channel through which the matrices are presented to the distributor proper after casting, the two said channels being arranged constantly above the magazine and in cooperative relation to each other.

83. In a typographical composing, casting and distributing machine equipped with a matrix magazine, the combination of assembling, casting and distributing channels arranged at a common level above the magazine, the casting channel standing normally in registration with the assembling channel and the distributing channel being disposed forwardly thereof, and means acting at each operation of the machine to move the casting channel rearwardly into operative relation to the mold, thereafter forwardly into registration with the distributing channel, and finally rearwardly back into registration with the assembling channel.

84. In a typographical composing, casting and distributing machine equipped with a matrix magazine, the combination of assembling, casting and distributing channels arranged at a common level above the magazine, the casting channel standing normally in registration with the assembling and the distributing channel being disposed forwardly thereof, and means acting at each operation of the machine to move the casting channel rearwardly into operative relation to the mold, thereafter forwardly into registration with the distributing channel, and finally rearwardly back into registration with the assembling channel, with a transfer device to shift the composed line from the assembling channel into the casting channel when the two are in registration, and a further transfer device to shift the matrices of the composed line from the casting channel into the distributing channel when the two are in registration.

85. In a typographical composing, casting and distributing machine equipped with a matrix magazine, the combination of assembling, casting and distributing channels arranged at a common level above the magazine, the casting channel standing normally in registration with the assembling channel and the distributing channel being disposed forwardly thereof, and means acting at each operation of the machine to move the casting channel rearwardly into operative relation to the mold, thereafter forwardly into registration with the distributing channel, and finally rearwardly back into registration with the assembling channel, with spacer lifting means acting to withdraw the spacers vertically from the casting channel at some point in its travel from the mold to the distributing channel.

86. In a typographical composing, casting and distributing machine equipped with a matrix magazine, the combination of assembling, casting and distributing channels arranged at a common level above the magazine, the distributing channel being disposed forwardly of the assembling channel, and the casting channel standing normally in registration with the assembling channel, a spacer magazine arranged above the assembling channel, means acting at each operation of the machine to move the casting channel rearwardly into operative relation to the mold, next forwardly into registration with the assembling channel, then forwardly into registration with the distributing channel, and finally rearwardly back into registration with the assembling channel, a transfer device to shift the composed line from the assembling channel into the casting channel before the movement of the latter, means acting when the casting channel is moved from the mold into registration with the assembling channel to lift the spacers of the composed line from the casting channel and locate them in line with the spacer magazine, a further transfer device to shift the spacers in their raised condition back into said spacer magazine, and another transfer device acting when the casting channel is brought into registration with the distributing channel to shift the matrices of the composed line from the former into the latter.

87. In a typographical composing and casting machine, the combination of an assembling channel wherein the line is composed, a mold arranged to one side of said channel and at the same level, and a casting channel standing normally in registration with the assembling channel and movable horizontally into operative relation to the mold.

88. In a typographical composing and casting machine, the combination of a fixed assembling channel wherein the line is composed, a mold arranged at the same level as the assembling channel, and a casting channel constructed and arranged to receive the entire composed line directly from the assembling channel and movable to present it as a whole in operative relation to the mold.

89. A typographical casting and distributing machine equipped with casting and distributing channels arranged at a common level, the said casting channel being movable horizontally into and out of registration with the distributing channel.

90. A typographical composing, casting and distributing machine equipped with assembling, casting and distributing channels arranged at a common level, the said casting channel being movable horizontally into and out of registration with the assembling and distributing channels alternately.

91. In a typographical composing, casting and distributing machine, the combination of assembling, casting and distributing channels arranged in that order from one side of the machine to the other, and means for shifting the composed line through all of said channels in the same direction.

In testimony whereof, I have affixed my signature hereto.

JOHN S. THOMPSON.